(12) United States Patent
Kessler et al.

(10) Patent No.: US 7,224,366 B2
(45) Date of Patent: May 29, 2007

(54) METHOD AND SYSTEM FOR CONTROL SYSTEM SOFTWARE

(75) Inventors: Joseph Kessler, Wylie, TX (US); Mark R. Lee, Richardson, TX (US); Robert Pittana, Plano, TX (US)

(73) Assignee: AMX, LLC, Richardson, TX (US)

( * ) Notice: Subject to any disclaimer, the term of this patent is extended or adjusted under 35 U.S.C. 154(b) by 398 days.

(21) Appl. No.: 10/650,648

(22) Filed: Aug. 28, 2003

(65) Prior Publication Data

US 2004/0085361 A1    May 6, 2004

(51) Int. Cl.
G06T 13/00 (2006.01)
(52) U.S. Cl. .............. 345/473; 345/173; 345/174; 345/175; 345/176; 345/177; 715/512
(58) Field of Classification Search .......... 345/473, 345/173, 174, 175, 176, 177, 512; 715/512
See application file for complete search history.

(56) References Cited

U.S. PATENT DOCUMENTS

| | | | |
|---|---|---|---|
| 3,597,743 A | 8/1971 | Murphy et al. | 340/172.5 |
| 3,778,542 A | 12/1973 | Hanseman | 178/5.4 R |
| 4,024,505 A | 5/1977 | Sperling | 340/172.5 |
| 4,251,858 A | 2/1981 | Cambigue et al. | 364/102 |
| 4,503,497 A | 3/1985 | Krygowski et al. | 364/200 |
| 4,530,069 A | 7/1985 | Desrochers | 364/900 |
| 4,700,230 A | 10/1987 | Pshtissky et al. | 358/181 |
| 4,790,003 A | 12/1988 | Kepley et al. | 379/88 |
| 4,876,651 A | 10/1989 | Dawson et al. | 364/449 |
| 4,882,747 A | 11/1989 | Williams | 379/102 |
| 4,904,993 A | 2/1990 | Sato | 340/825.57 |
| 4,914,527 A | 4/1990 | Asai et al. | |
| 4,953,194 A | 8/1990 | Hansen et al. | 379/25 |
| 4,989,081 A | 1/1991 | Miyagawa et al. | 358/93 |

(Continued)

FOREIGN PATENT DOCUMENTS

EP    0449632 A    10/1991

(Continued)

OTHER PUBLICATIONS

AXCESS Language Tutorial—Version 2.1, Mar. 1993.

(Continued)

*Primary Examiner*—Kimbinh T. Nguyen
(74) *Attorney, Agent, or Firm*—Karl L. Larson; Gardere Wynne Sewell, LLP

(57) ABSTRACT

The present invention discloses a method for building and displaying control and non-interactive, non-control information on a touch panel. The method can include constructing a page for display on the touch panel, configuring one or more graphical display units and one or more sub-pages for display on the page, and displaying the page, graphical display units and sub-pages, selectively, on the touch panel. The method further includes determining whether any of the graphical display units is activated by a touch message applied to a location on the touch panel. Respective graphical display units may be selectively provided with features from a group of features that includes bitmaps, icons, borders and text. Two graphical display units having respective active touch areas may be displayed on the touch panel so that their active touch areas are separated by no more than one pixel.

3 Claims, 24 Drawing Sheets

U.S. PATENT DOCUMENTS

| | | | |
|---|---|---|---|
| 5,014,193 A | 5/1991 | Garner et al. ................ 364/200 |
| 5,039,980 A | 8/1991 | Aggers et al. .............. 340/506 |
| 5,051,720 A | 9/1991 | Kittirutsunetorn ...... 340/310 R |
| 5,056,001 A | 10/1991 | Sexton ....................... 364/200 |
| 5,072,374 A | 12/1991 | Sexton et al. ............... 395/800 |
| 5,086,385 A | 2/1992 | Launey et al. .............. 364/188 |
| 5,095,480 A | 3/1992 | Fenner .................... 370/94.1 |
| 5,103,391 A | 4/1992 | Barrett ....................... 364/133 |
| 5,109,222 A | 4/1992 | Welty .................... 340/825.72 |
| 5,119,479 A | 6/1992 | Arai et al. ................. 395/275 |
| 5,144,548 A | 9/1992 | Salandro ..................... 364/138 |
| 5,233,510 A | 8/1993 | Brueckner et al. .......... 364/131 |
| 5,276,630 A | 1/1994 | Baldwin et al. ............. 364/505 |
| 5,276,793 A | 1/1994 | Borgendale et al. ........ 395/148 |
| 5,311,451 A | 5/1994 | Barrett ....................... 364/550 |
| 5,317,562 A | 5/1994 | Nardin et al. ................. 370/16 |
| 5,347,632 A | 9/1994 | Filepp et al. ............... 395/200 |
| 5,371,859 A | 12/1994 | Lennartsson ................ 395/325 |
| 5,375,248 A | 12/1994 | Lemay et al. ............... 395/800 |
| 5,388,213 A | 2/1995 | Oppenheimer et al. ..... 395/200 |
| 5,410,326 A | 4/1995 | Goldstein ................... 348/134 |
| 5,428,470 A | 6/1995 | Labriola, II ................. 359/119 |
| 5,434,982 A | 7/1995 | Calzi ........................... 395/325 |
| 5,444,851 A | 8/1995 | Woest ..................... 395/200.1 |
| 5,446,740 A | 8/1995 | Yien et al. ............... 370/110.1 |
| 5,450,359 A | 9/1995 | Sharma et al. .......... 364/514 R |
| 5,452,291 A | 9/1995 | Eisenhandler et al. ........ 370/54 |
| 5,455,959 A | 10/1995 | Simmering ................. 395/800 |
| 5,463,735 A | 10/1995 | Pascucci et al. ......... 395/200.1 |
| 5,467,264 A | 11/1995 | Rauch et al. ............... 364/141 |
| 5,481,750 A | 1/1996 | Parise et al. ................ 395/800 |
| 5,491,797 A | 2/1996 | Thompson et al. .... 395/200.03 |
| 5,491,802 A | 2/1996 | Thompson et al. .... 395/200.18 |
| 5,500,794 A | 3/1996 | Fujita et al. ................ 364/188 |
| 5,510,975 A | 4/1996 | Ziegler, Jr. ................. 364/148 |
| 5,519,707 A | 5/1996 | Subramanian et al. ..... 370/94.2 |
| 5,519,875 A | 5/1996 | Yokoyama et al. ......... 395/800 |
| 5,528,215 A | 6/1996 | Siu et al. ................. 340/286.01 |
| 5,528,739 A | 6/1996 | Lucas et al. ................. 395/145 |
| 5,537,142 A | 7/1996 | Fenouil ........................ 348/12 |
| 5,537,663 A | 7/1996 | Belmont et al. ............. 395/837 |
| 5,557,723 A | 9/1996 | Holt et al. ................... 395/149 |
| 5,565,855 A | 10/1996 | Knibbe ................. 340/825.06 |
| 5,565,908 A | 10/1996 | Ahmad .......................... 348/7 |
| 5,568,367 A | 10/1996 | Park |
| 5,568,489 A | 10/1996 | Yien et al. ............... 370/110.1 |
| 5,570,085 A | 10/1996 | Bertsch ................. 340/825.07 |
| 5,572,643 A | 11/1996 | Judson ....................... 395/793 |
| 5,583,994 A | 12/1996 | Rangan ................. 395/200.09 |
| 5,586,267 A | 12/1996 | Chatwani et al. ...... 395/200.11 |
| 5,592,626 A | 1/1997 | Papadimitriou et al. ..................... 395/200.09 |
| 5,594,366 A | 1/1997 | Khong et al. ................. 326/41 |
| 5,600,635 A | 2/1997 | Hamaki et al. .............. 370/280 |
| 5,630,079 A | 5/1997 | McLaughlin ................ 395/335 |
| 5,634,011 A | 5/1997 | Auerbach .................... 395/200 |
| 5,648,813 A | 7/1997 | Tanigawa et al. ............ 348/10 |
| 5,657,221 A | 8/1997 | Warman et al. ............. 364/188 |
| 5,675,756 A | 10/1997 | Benton et al. ............... 395/349 |
| 5,687,393 A | 11/1997 | Brown et al. ............... 395/849 |
| 5,689,353 A | 11/1997 | Darbee et al. |
| 5,699,532 A | 12/1997 | Barrett et al. ............... 395/309 |
| 5,706,455 A | 1/1998 | Benton et al. ............... 395/348 |
| 5,710,755 A | 1/1998 | Chen ............................ 370/24 |
| 5,720,032 A | 2/1998 | Picazo, Jr. et al. ....... 395/200.2 |
| 5,721,878 A | 2/1998 | Ottesen et al. |
| 5,724,574 A | 3/1998 | Stratigos et al. ............ 395/610 |
| 5,732,257 A | 3/1998 | Atkinson et al. ............ 395/604 |
| 5,737,529 A | 4/1998 | Dolin, Jr. et al. ....... 395/200.18 |
| 5,737,553 A | 4/1998 | Bartok ........................ 395/339 |
| 5,739,760 A | 4/1998 | Hatakeyama .......... 340/825.15 |
| 5,740,231 A | 4/1998 | Cohn et al. .................... 379/89 |
| 5,742,762 A | 4/1998 | Scholl et al. ............ 395/200.3 |
| 5,754,255 A | 5/1998 | Takamori ................... 348/705 |
| 5,764,155 A | 6/1998 | Kertesz et al. ......... 340/825.08 |
| 5,805,812 A | 9/1998 | Fish et al. .............. 395/200.38 |
| 5,812,085 A | 9/1998 | Barraza et al. |
| 5,812,122 A | 9/1998 | Ng .............................. 345/326 |
| 5,812,214 A | 9/1998 | Miller ........................ 348/587 |
| 5,812,750 A | 9/1998 | Dev et al. .............. 395/182.02 |
| 5,815,516 A | 9/1998 | Aaker et al. .................. 371/53 |
| 5,815,703 A | 9/1998 | Copeland et al. ........... 395/613 |
| 5,835,126 A | 11/1998 | Lewis ............................ 348/8 |
| 5,844,572 A | 12/1998 | Schott |
| 5,848,054 A | 12/1998 | Mosebrook et al. ........ 370/226 |
| 5,857,199 A | 1/1999 | Tamano et al. ............. 707/104 |
| 5,867,484 A | 2/1999 | Shaunfield ................. 370/254 |
| 5,886,894 A | 3/1999 | Rakoff ........................ 364/132 |
| 5,892,924 A | 4/1999 | Lyon et al. ............. 395/200.75 |
| 5,896,382 A | 4/1999 | Davis et al. ................. 370/401 |
| 5,907,837 A | 5/1999 | Ferrel et al. .................... 707/3 |
| 5,909,570 A | 6/1999 | Webber ...................... 395/500 |
| 5,910,954 A | 6/1999 | Bronstein et al. ........... 370/401 |
| 5,918,022 A | 6/1999 | Batz et al. ............. 395/200.66 |
| 5,920,694 A | 7/1999 | Carleton et al. ........ 395/200.35 |
| 5,922,050 A | 7/1999 | Madany ...................... 709/222 |
| 5,926,187 A | 7/1999 | Kim ............................ 345/435 |
| 5,935,003 A | 8/1999 | Stephens et al. .............. 463/31 |
| 5,940,387 A | 8/1999 | Humpleman ................ 370/352 |
| 5,943,064 A | 8/1999 | Hong .......................... 345/502 |
| 5,956,487 A | 9/1999 | Venkatraman et al. . 395/200.48 |
| 5,957,985 A | 9/1999 | Wong et al. .................. 701/33 |
| 5,959,536 A | 9/1999 | Chambers et al. .......... 340/636 |
| 5,968,116 A | 10/1999 | Day, II et al. .............. 709/202 |
| 5,977,989 A | 11/1999 | Lee et al. .................... 345/503 |
| 5,982,445 A | 11/1999 | Eyer et al. ................... 348/461 |
| 5,995,753 A | 11/1999 | Walker ........................ 395/702 |
| 5,996,022 A | 11/1999 | Krueger et al. ............. 709/247 |
| 6,005,861 A | 12/1999 | Humpleman ................ 370/352 |
| 6,008,735 A | 12/1999 | Chiloyan et al. ....... 340/825.22 |
| 6,012,113 A | 1/2000 | Tuckner ....................... 710/64 |
| 6,021,433 A | 2/2000 | Payne et al. ................. 709/219 |
| 6,023,762 A | 2/2000 | Dean et al. .................. 713/193 |
| 6,029,092 A | 2/2000 | Stein ............................ 700/11 |
| 6,038,668 A | 3/2000 | Chipman et al. ............ 713/201 |
| 6,049,821 A | 4/2000 | Theriault et al. ............ 709/203 |
| 6,049,828 A | 4/2000 | Dev et al. .................... 709/224 |
| 6,052,683 A | 4/2000 | Irwin ............................ 707/8 |
| 6,055,236 A | 4/2000 | Nessett et al. ............... 370/389 |
| 6,055,368 A | 4/2000 | Kunioka ................. 395/500.34 |
| 6,061,602 A | 5/2000 | Meyer .......................... 700/83 |
| 6,061,717 A | 5/2000 | Carleton et al. ............. 709/205 |
| 6,075,776 A | 6/2000 | Tanimoto et al. ........... 370/254 |
| 6,078,747 A | 6/2000 | Jewitt .......................... 395/712 |
| 6,078,952 A | 6/2000 | Fielding et al. .............. 709/221 |
| 6,085,238 A | 7/2000 | Yuasa et al. ................. 709/223 |
| 6,085,243 A | 7/2000 | Fletcher et al. .............. 709/224 |
| 6,088,717 A | 7/2000 | Reed et al. .................. 709/201 |
| 6,101,189 A | 8/2000 | Tsuruoka ..................... 370/401 |
| 6,105,055 A | 8/2000 | Pizano et al. ................ 709/204 |
| 6,108,696 A | 8/2000 | Mendhekar et al. ........ 709/217 |
| 6,115,713 A | 9/2000 | Pascucci et al. ............. 707/10 |
| 6,121,593 A | 9/2000 | Mansbery et al. .......... 219/679 |
| 6,133,847 A | 10/2000 | Yang .................... 340/825.22 |
| 6,144,993 A | 11/2000 | Fukunaga et al. ........... 709/208 |
| 6,160,796 A | 12/2000 | Zou ............................ 370/257 |
| 6,161,133 A | 12/2000 | Kikinis ....................... 709/220 |
| 6,161,145 A | 12/2000 | Bainbridge et al. ......... 709/246 |
| 6,167,567 A | 12/2000 | Chiles et al. ................. 717/11 |
| 6,175,920 B1 | 1/2001 | Schanze ..................... 713/150 |
| 6,192,282 B1 | 2/2001 | Smith et al. ................... 700/19 |
| 6,195,688 B1 | 2/2001 | Caldwell et al. ............ 709/208 |
| 6,198,479 B1 | 3/2001 | Humpleman et al. ....... 345/329 |
| 6,199,133 B1 | 3/2001 | Schnell ....................... 710/110 |

| | | | |
|---|---|---|---|
| 6,240,554 B1 | 5/2001 | Fenouil | 725/105 |
| 6,241,156 B1 | 6/2001 | Kline et al. | 236/49.3 |
| 6,259,707 B1 | 7/2001 | Dara-Abrams | 370/486 |
| 6,260,069 B1 | 7/2001 | Anglin | 709/229 |
| 6,266,339 B1 | 7/2001 | Donahue et al. | 370/432 |
| 6,272,134 B1 | 8/2001 | Bass et al. | 370/390 |
| 6,288,716 B1 | 9/2001 | Humpleman et al. | 345/329 |
| 6,292,901 B1 | 9/2001 | Lys et al. | 713/300 |
| 6,310,879 B2 | 10/2001 | Zhou et al. | 370/397 |
| 6,330,238 B1 | 12/2001 | Ooe | 370/390 |
| 6,338,152 B1 | 1/2002 | Fera et al. | 714/48 |
| 6,342,906 B1 | 1/2002 | Kumar et al. | 345/751 |
| 6,360,270 B1 | 3/2002 | Cherkasova et al. | 709/229 |
| 6,363,422 B1 | 3/2002 | Hunter et al. | 709/224 |
| 6,415,328 B1 | 7/2002 | Korst | |
| 6,434,157 B1 | 8/2002 | Dube et al. | 370/401 |
| 6,434,680 B2 | 8/2002 | Belknap et al. | 711/161 |
| 6,437,691 B1 | 8/2002 | Sandelman et al. | 340/506 |
| 6,446,130 B1 | 9/2002 | Grapes | |
| 6,456,699 B1 | 9/2002 | Burg et al. | 379/88.17 |
| 6,469,695 B1 | 10/2002 | White | 345/173 |
| 6,469,987 B1 | 10/2002 | Rijhsinghani | 370/254 |
| 6,477,569 B1 | 11/2002 | Sayan et al. | 709/223 |
| 6,484,061 B2 | 11/2002 | Papadopoulos et al. | 700/83 |
| 6,484,149 B1 | 11/2002 | Jammes et al. | 705/26 |
| 6,496,927 B1 | 12/2002 | McGrane et al. | 713/1 |
| 6,505,146 B1 | 1/2003 | Blackmer | 702/189 |
| 6,523,696 B1 | 2/2003 | Saito et al. | 209/223 |
| 6,542,165 B1 | 4/2003 | Ohkado | 345/751 |
| 6,546,405 B2 | 4/2003 | Gupta et al. | 707/512 |
| 6,553,418 B1 | 4/2003 | Collins et al. | 709/224 |
| 6,574,234 B1 | 6/2003 | Myer et al. | 370/462 |
| 6,609,127 B1 | 8/2003 | Lee et al. | 707/10 |
| 6,615,088 B1 | 9/2003 | Myer et al. | 700/20 |
| 6,657,646 B2 | 12/2003 | Partridge et al. | 345/835 |
| 6,680,934 B1 | 1/2004 | Cain | 370/352 |
| 6,697,376 B1 | 2/2004 | Son et al. | |
| 6,744,771 B1 | 6/2004 | Barber et al. | 370/400 |
| 6,760,760 B1 | 7/2004 | McGrane | 709/219 |
| 6,763,040 B1 | 7/2004 | Hite et al. | 370/522 |
| 6,775,654 B1 | 8/2004 | Yokoyama et al. | |
| 6,791,554 B1 | 9/2004 | Mergard et al. | |
| 6,801,529 B1 | 10/2004 | McGrane et al. | 370/390 |
| 6,829,368 B2 | 12/2004 | Meyer et al. | |
| 6,865,596 B1 | 3/2005 | Barber et al. | 709/208 |
| 6,868,403 B1 | 3/2005 | Wiser et al. | |
| 6,934,414 B2 | 8/2005 | Kondo et al. | |
| 6,937,766 B1 | 8/2005 | Wilf et al. | |
| 7,076,153 B2 | 7/2006 | Ando et al. | |
| 2002/0013948 A1 | 1/2002 | Aguayo et al. | |
| 2002/0176601 A1 | 11/2002 | Rhoads | |
| 2003/0035556 A1 | 2/2003 | Curtis et al. | |
| 2003/0149574 A1 | 8/2003 | Rudman | |
| 2004/0034864 A1 | 2/2004 | Barrett et al. | |
| 2004/0044742 A1 | 3/2004 | Evron et al. | |
| 2004/0075694 A1 | 4/2004 | Partridge et al. | |
| 2004/0196255 A1 | 10/2004 | Cheng | |
| 2005/0273700 A1 | 12/2005 | Champion et al. | |
| 2006/0067341 A1 | 3/2006 | Barber et al. | |

FOREIGN PATENT DOCUMENTS

| | | |
|---|---|---|
| EP | 0626635 A2 | 11/1994 |
| EP | 0658899 A | 6/1995 |
| EP | 0743595 A | 5/1996 |
| EP | 0798894 | 10/1997 |
| EP | 0812086 | 12/1997 |
| EP | 0841615 A | 5/1998 |
| EP | 0841616 A | 5/1998 |
| EP | 0915469 A | 5/1999 |
| EP | 0939517 A1 | 9/1999 |
| EP | 0530973 A1 | 10/2003 |
| JP | 10276478 | 10/1998 |
| WO | WO 95/21415 A | 8/1995 |
| WO | WO 96/24231 A | 8/1996 |
| WO | WO 97/18636 | 5/1997 |
| WO | WO 97/26587 | 7/1997 |
| WO | WO 97/44747 | 11/1997 |
| WO | WO 98/00788 | 1/1998 |
| WO | WO 98/11510 A | 3/1998 |
| WO | WO 98/35335 | 8/1998 |
| WO | WO 98/36336 A | 8/1998 |
| WO | WO 98/53581 | 11/1998 |
| WO | WO 99/03255 | 1/1999 |
| WO | WO 99/05584 A | 2/1999 |
| WO | WO 99/24905 | 5/1999 |
| WO | WO 00/28403 | 5/2000 |
| WO | WO 00/67135 | 11/2000 |
| WO | WO 00/75738 A1 | 12/2000 |
| WO | WO 00/75903 A2 | 12/2000 |

OTHER PUBLICATIONS

K. Tindell: "Guaranteeing Message Latencies on Control Area Network (CAN)," 1st CAN Int'l Conf., http://www.loria.fr/~simonot/SlidesCSSEA/Tindell_ICC_TB_Sept._94.pdf.
8.5" Touch Panels, Oct. 1995.
P.M. Corcoran et al: "CEBus Network Access via the World Wide Web," p. 236-237, IEE Transactions on Consumer Electronics, Aug. 1996.
10.4" Color LCD Tiltscreens, Oct. 1997.
Powered By AXlink, Oct. 1997.
Viewpoint Wireless Touch Panel, Jun. 1998.
New Products Infocomm '98, Jun. 1998.
Global WebLinx, 1999.
Landmark Designer 2.2 User Guide (Preliminary Copy), Mar. 1, 1999.
AXB-TPI/3 Touch Panel Interface 3, May 1999.
Cisco and Infoseek Align With Panja to Bring Rich Internet Content to 2 Billion Consumer Devices, Jul. 19, 1999.
Panja WebLinx Server and Internet Development Kit (IDK) (Version 1.02 or higher) Instruction Manual, Oct. 1999.
Panja WebLinx Administrator Program (Version 1.0 or higher) Instruction Manual, Oct. 1999.
Global Connectivity Global WebLinx, 2000.
Panja Announces First Shipments of Panja 1000 Units, Jan. 24, 2000.
NetLinx Hub Cards and Modules—Instruction Manual, Mar. 2000.
NetLinx Master Cards and Modules—Instruction Manual—Preliminary, May 2000.
NetLinx CardFrame, Control Cards, and NetModules—Instruction Manual—Preliminary, May 2000.
NetLinx Programming Language—Instruction Manual, May 2000.
Panja Ethernet Gateway, May 2000.
NetLinx Quick Setup Guide, Jun. 2000.
Landmark Designer—Instruction Manual—Preliminary, Oct. 2000.
NXI NetLinx Integrated Controller—Integrated Controllers—Instruction Manual—Preliminary, Nov. 2000.
Instruction Manual—VPXpress—ViewPoint System Design/Programming Software Program (Version 1.1 or higher), Jul. 2001.
Quick Start Guide—AXB-TPI/3—Touch Panel Interface 3, Oct. 2002.
TPDesign3—Touch Panel Design Program (Version 3.16), Dec. 2002.
Instruction Manual—10.4" Touch Panels (Firmware version G3), Jun. 2003.
AMX Revolutionizes Touch Panel Interaction with Launch of TakeNoteTM Interactive Collaboration Tool, Jun. 9, 2004.
Quick Start Guide, NXA-USBTN G4 USB Computer Control Stick with TakeNote, Jun. 9, 2004.
NetLinx Duet, Sep. 2004.
NetLinx Duet—Inconcert Partner Benefits, Sep. 2004.
AMX Extends NetLinx(TM) With Java(TM) for Industry's First Dual Language Control, Sep. 10, 2004.
NetLinx Master Firmware—Version 3.0, Sep. 10, 2004.

AMX Partners With Leading Manufacturers to Leverage Dynamic Device Discovery Technology, Jun. 8, 2005.
Mio R-1 Remote, Sep. 2005.
Quick Start Guide—Mio R-1 Remote Control Device, Sep. 2005.
Instruction Manual—Mio R-1 Remote Control Device, Sep. 2005.
AMX Instruction Manual—Standard NetLinx API (SNAP) R 1.6.0, Dec. 19, 2005.
AMX Instruction Manual—Café Duet TM—Integrated Development Environment for NetLinx Duet (version 1.7)—User's Guide, Apr. 6, 2006.
AMX Celebrates Significant Dynamic Device Discovery Protocol Milestones at Infocomm 2006, Jun. 7, 2006.
U.S. Appl. No. 09/589,576 entitled *"Method and System for Providing Access to Elements on a Control Area Network"* filed Jun. 7, 2000; Inventor: Thomas D. Hite—now abandoned.
U.S. Appl. No. 09/328,032 entitled *"Method and System for Dynamically Assigning Device Numbers in a Control System"* filed Jun. 8, 1999; Inventor: Barber et al.—now abandoned.
Pending U.S. Appl. No. 09/561,105 entitled "Internet Control System and Method" filed Apr. 28, 2000; Inventors: Thomas Hite et al.
U.S. Appl. No. 09/561,104 entitled *"Internet Application Control System and Method"* filed Apr. 28, 2000; Inventor: Thomas D. Hite—now abandoned.
U.S. Appl. No. 09/561,103 entitled *"Dynamic Messaging System and Method"* filed Apr. 28, 2000; Inventor: Thomas D. Hite et al.—now abandoned.
U.S. Appl. No. 09/696,802, entitled *"System and Method of Mining World Wide Web Content"* filed Oct. 25, 2000; Inventor: Subramanian et al.—now abandoned.
U.S. Appl. No. 09/328,922 entitled *"System and Method for Monitoring Video Inputs"* filed Jun. 9, 1999; Inventor: Aaron Myer—now abandoned.
U.S. Appl. No. 09/328,923 entitled *"System and Method for Integrating Multiple Video Switches into a Video Matrix"* filed Jun. 9, 1999; Inventor: Aaron Myer et al.—now abandoned.
Pending U.S. Appl. No. 10/992,087 entitled *"Method and Computer Program for Implementing Interactive Bargraphs of any Shape or Design on a Graphical User Interface"* filed Nov. 18, 2004; Inventor: Kessler et al.
Pending U.S. Appl. No. 60/715,252 entitled *"Method and Computer Program for Device Configuration"* filed Sep. 7, 2005; Inventors: Robert D. Ward et al.
Pending U.S. Appl. No. 60/715,252 entitled *"Remote Control with Power Management"* filed Sep. 7, 2005: Inventor: Michael S. Farmer et al.
Pending U.S. Appl. No. 11/219,300 entitled *"System and Method of Device Interface Configuration for Control System"* filed Sep. 2, 2005; Inventor: Aaron L. Myer et al.
F. Halsall, "Data Communications, Computer Networks and Open Systems," Addison-Wesley, p. 45-46 and 285-292 (1996)—XP-002162277.
Andrew Tanenbaum, "Computer Networks," Prentice Hall International (London), p. 345-403 (1996); XP-002155220.
D. Goodman, "The Complete Hypercard Handbook," 1988, Bantam Computer Books, USA, XP002151762, Chapter 10: All about buttons (1988).
C. Hedrick, "Routing Information Protocol," RFC 1058, Jun. 1988, pp. 1-29.
R. Droms, "Dynamic Host Configuration Protocol," RFC 1541, Oct. 1993, pp. 1-34.
Peter M. Corcoran, et al., "Browser-Style Interfaces to a Home Automation Network," IEEE Transactions on Consumer Electronics, IEEE Inc. (New York), vol. 43 (No. 4), p. 1063-1069 (Nov. 1, 1997).
Joe Desbonnet, et al., "System Architecture and Implementation of a CEBus/Internet Gateway," IEEE Transactions on Consumer Electronics (New York), vol. 43 (No. 4), p. 1057-1062, XP-000768558.
"Crestron SpectrumTM STX-3500C 2 Way RF Wireless Touchscreen Control Panel," Crestron Remote Control Systems, Nov. 1997.
Gagnon F. et al., "On the Development of a Generic Interface for HLA and DIS Simulations," IEEE 1998, pp. 52-59, XP-002138396.

Tilo Klesper, "Der Internet-Zugriff aufs LON / Weltweiter Zugriff auf die Sensorik und Aktorik von Automatisierungs—Projekten," Elektronik (Germany), vol. 47 (No. 8), p. 60, 62, 64 and 66-68 (Aug. 1998).
Gopal, Inder S., et al. "Dynamic Address Assignment in Broadcast Networks" IEEE Transactions on Communications, US, IEEE Inc. New York, vol. COM-34, No. 1, Jan. 1986 (Jan. 1966), pp. 31-37 XP00811899 ISSN: 0090-6776.
Loucks E M et al. "Implementation of a Dynamic Address Assignment Protocol in a Local Area Network" Computer Networks and ISDN Systems, North Holland Publishing. Amsterdam, NL, vol. 11, No. 2, Feb. 1986, pp. 133-146, XP000212676 ISSN: 0169-7552.
Tsuchiya P F "Efficient Utilization of Two-Level Hierarchical Addresses" Proceedings of the Global Telecommunications Conference (Globecom), US, New York, IEEE, vol. —, Dec. 6, 1992, pp. 1016-1021, XP000357710 ISBN: 0-7803-0608-2.
Qunjie Wang et al., "EM-an environment manager for building networked virtual environments" IEEE Virtual Reality Annual Intern. Symp., pp. 11-18, Mar. 1995.
Khosia, R., "Human-centered virtual machine of problem solving agents, software agents, intelligent agents and objects", IEEE High-Assurance Systems Engineering Symp., pp. 312-319, Nov. 1998.
Palm, Inc.—Palm VII Connected Organizer Web Clipping "Web Clipping, Not Web Browsing" internet website article located at: http://www.palm.com/products/palmvii/webclipping.html, dated May 25, 2000; 4 pages.
Aether Software—Products & Demo "ScoutWebTM Web-Enabling the Mobile Enterprise" internet website article located at: http://www.riverbedtech.com/scoutware/index.phtml?i=sw, dated May 25, 2000; 11 pages.
Palm OS® "Web Clipping Development" internet website article located at: http://www.palmos.com/dev/tech/webclipping/, dated May 25, 2000; 18 pages.
Omni Sky: Products and Services: Web "All the Web You Want" internet website article located at: http://secure.omnisky.com/products...d$LGPZLPIAAAJLTOFINOGSFEWAVBWAYIVO, dated May 25, 2000; 9 pages.
Mapquest Corporate: Copyright Information, internet website article located at: wysiwyg://89http://mapquest.c...ght&uid=udu49aj5i058jble:b51f7w5u2, dated May 25, 2000; 10 pages.
YAHOO! Terms of Service, internet website article located at: http://docs.yahoo.com/info/terms/, dated May 25, 2000; 9 pages.
PANJA "What is the Panja 1000?" internet website article located at: wysiwyg://33/http://www.buyapanja.com/, dated May 25, 2000; 3 pages.
Cellular Unlimited "Cellular Unlimited Rogers AT&T...on Pagers and Wireless Web Browser" internet website article located at: http://www.cantel-amigo.com/blackberry.html, dated May 25, 2000; 5 pages.
Research in Motion Ltd., "BlackBerry Technical White Paper", Version 1.0, dated 1998-1999, 17 pages.
OSGI Allliance "OSGi Technology" internet website article located at: http://www.osig.org/osgi_technology/index.asp?section=2 dated Aug. 6, 2004, 5 pages.
OSGI Alliance"About the OSGi Service Platform—Technical Whitepaper" pamphlet dated Jul. 12, 2004, Revision 3.0, 17 pages.
CEROVIEW "Touch Screens" internet website article located at: www.ceroview.com/peripherals/touchspecs/touchtech.html dated May 11, 2004, 3 pages.
Cucos, Alexander, et al. "Real Time ATM for remote access to Home Automation and Digital Home A/V Networks," IEEE Transactions on Consumer Electronics, IEEE Inc. (New York) vol. 44 (No. 3) p. 482-489 (Jun. 17, 1998).
Comer, Douglas E. "Internetworking With TCP/IP" vol. I, Principles, Protocols, and Architecture, published 1995, pp. 89-94, 203-207 and 291-292 (1995).
Hill Associates, Inc. "Remote Access and TCP/IP," Colchester, Vermont, dated Jan. 1998, pp. 616.3.1-616.3.11.
AMX Instruction Manual - Design XPress for NetLinx Studio, Step-by-Step User's Guide, 2002.
AMX Instruction Manual - Design XPress for NetLinx Studio, On-Site Installer's Guide, 2002.

AMX Instruction Manual - Design XPress -Home Theater version 1.2, Advanced Programmer's Guide, 2003.

AMX Instruction Manual - Design XPress - Professional version 1.1, User-Interface Guide, 2004.

AMX Instruction Manual - Design XPress - Professional version 1.1, On-Site Installer's Guide, 2004.

AMX Instruction Manual - Design XPress -Professional version 1.1, Programmer's Guide, Aug. 11, 2004.

AMX Instruction Manual - Design XPress - Home Theater version 1.3, Programmer's Guide, 2005.

AMX Instruction Manual - Design XPress - Home Theater version 1.3, User Interface Guide, 2005.

AMX Instruction Manual - Design XPress - Home Theater version 1.3, On-Site Installer's Guide, 2005.

AMX Instruction Manual - Design XPress for NetLinx Studio version 1.5, User Interface Guide, 2005.

AMX Instruction Manual - Design XPress for NetLinx Studio version 1.5, Programmer's Guide, 2005.

AMX Instruction Manual - Design XPress for NetLinx Studio, version 1.5, Installer's Guide, 2005.

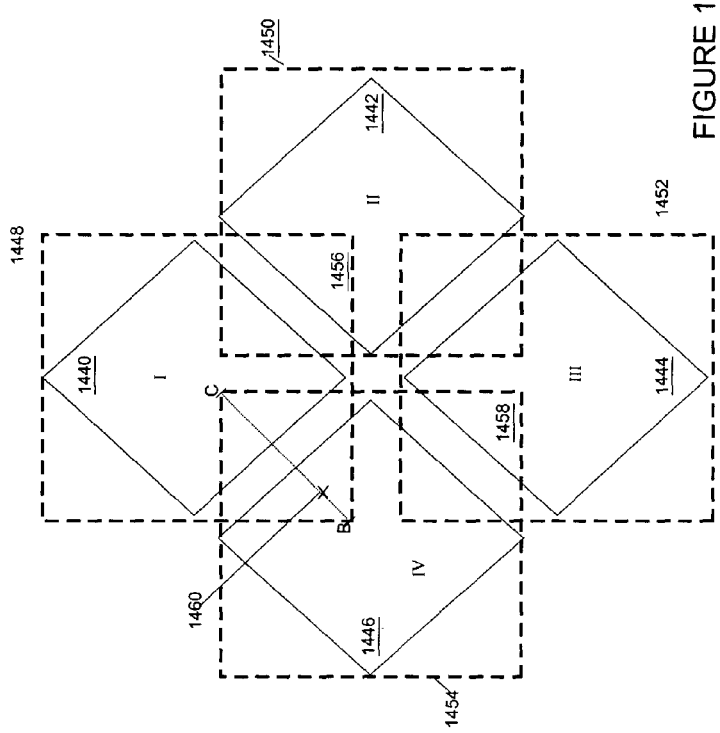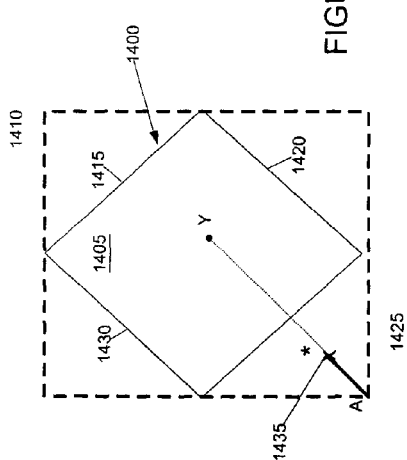
FIGURE 14
FIGURE 14A
FIGURE 14B

METHOD AND SYSTEM FOR CONTROL SYSTEM SOFTWARE

TECHNICAL FIELD OF THE INVENTION

The present invention relates to methods for displaying user control information on a touch panel and more particularly, the present invention relates to methods for building interactive control and non-interactive, non-control informational displays onto a touch panel screen.

BACKGROUND OF THE INVENTION

Touch panels are electronic devices that use liquid crystal displays (LCDs) to display functional information to a user. A touch panel is used to operate various pieces of equipment. For example, touch panels can be used to control the lighting system of a room, electronics equipment such as VCRs, DVDs, stereos, and the like, and video surveillance equipment, such as video cameras, and other similar types of equipment.

A touch panel operates by allowing the user to press a region of the LCD panel to operate an associated piece of equipment. The user knows the region of the LCD to touch because an informational display (sometimes referred to by those in the industry as "buttons") is presented to the user that allows the user to understand the appropriate location or region at which the panel should be touched. These informational displays are usually in the form of icons for the user to press. The icons are typically icons associated with the operation of the device. For example, a VCR may have a button for the play function and a button for the recording function of the VCR. These buttons would be displayed to the touch panel user in manner that would mimic their appearance on the remote control device for the VCR.

A problem arises, however, when multiple buttons are displayed on the touch panel in close proximity to each other. When this occurs, a single touch by a user can activate more than one button. This causes either an error to occur with the touch panel, or the touch panel itself prioritizes the buttons and selects the button with the higher priority to operate, often resulting in misoperation of the touch panel system. Therefore, it is desired to be able to build a touch panel display that allows for informational displays to be placed in close proximity to one another without resultant interference in the operations of the informational displays.

It has also been found advantageous to allow informational displays to be animated. Animation of an informational display enables certain control features to be displayed directly to the user to inform the user that the component associated with the informational display is in continuous operation. For example, an alarm system for a home may have an associated informational display that is a siren with a police light. By allowing animation, the police light can be continuously illuminated in a rotational manner to mimic a police car's lights. It is therefore desirable to have a touch panel capable of building animated informational displays.

SUMMARY OF THE INVENTION

The invention is directed to a method and system for building and displaying information on a touch panel, wherein the information may be control or non-control information, active or non-interactive information or some combination thereof. One embodiment of the invention, providing a method for building and displaying interactive, control, non-interactive and non-control information, selectively, on a touch panel comprises the steps of constructing the page for display on a touch panel, configuring a plurality of graphical display units in association with the page for display on the touch panel, and displaying the page and one or more of the graphical display unit, selectively, on the touch panel. The method further comprises the step of determining whether any of the graphical display units is activated by a touch message comprising an amount of pressure applied to a location on the touch panel.

In a preferred embodiment of the above method, each of the graphical display units is configured to have a total touch area comprising an active touch area and a non-active area, the active touch area of one graphical display unit overlapping a non-active area of another graphical display unit when both of the graphical display units are displayed. The determining step comprises determining whether the touch message location is within the active touch area of any graphical display unit on the touch panel, and if so, activating such graphical display unit.

In a further embodiment, each of the graphical display units is selectively provided with one or more colors, and is further provided with one or more features selected from a group of features that includes a bitmap, an icon, text and a border. Preferably, one or more sub-pages are configured in association with the page, at least one of the sub-pages comprising a video feed. Preferably also, at least one of the graphical display units comprises a bar graph having two or more states.

Another embodiment of the invention comprises a computer system provided with a processor and a computer readable medium operable to build and display interactive, control, non-interactive and non-control information, selectively, on a touch panel, in accordance with the invention.

BRIEF DESCRIPTION OF THE DRAWINGS

FIG. 14 is a diagram showing the active touch area of a graphical display unit of the present invention;

FIG. 14A is a diagram showing the active touch operation of a single graphical display unit in accordance with the present invention;

FIG. 14B is a diagram showing the active touch operation of a touch panel having an array of graphical display units in accordance with the present invention;

DETAILED DESCRIPTION OF INVENTION

Figure 1:
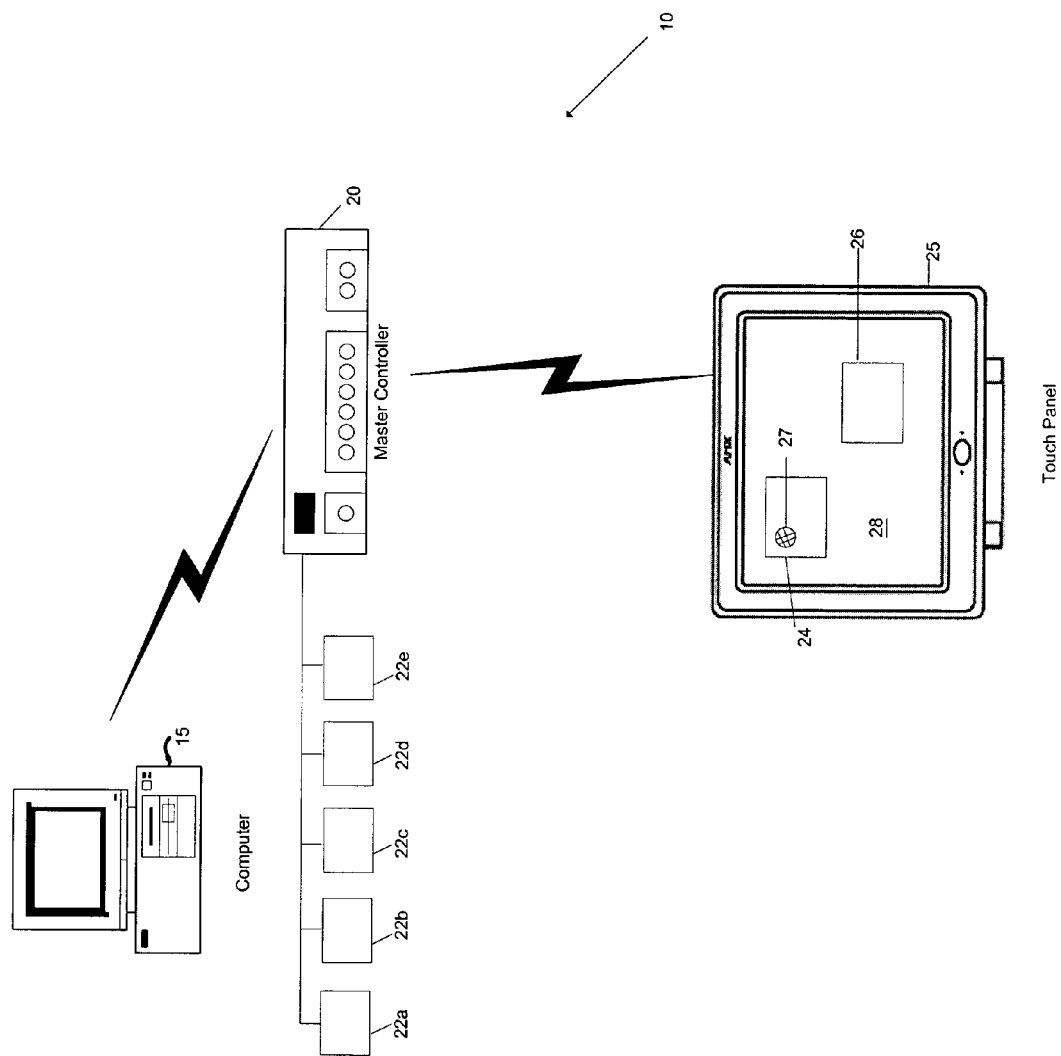
FIG. 1 is a system schematic diagram illustrating communications between components in a network in accordance with the present invention.

FIG. 1 shows the interactions and communications between components of a control system 10, wherein the system 10 includes one or more computers 15 in communication with one or more master controllers 20. The master controller 20 is in communication with one or more touch panels 25. The touch panels 25 may be desktop touch panels or wall display units. The master controller 20 may be attached to various components, so that respective components may be controlled by the control system 10 through master controller 20. These components may include, but are not limited to, lighting fixtures 22a, alarm systems 22b, video equipment 22c, household electronics equipment 22d, security systems 22e, and the like.

A user utilizes the computer 15 to create touch panel displays such as 24 and 26 for display by the touch panel. These touch panel displays can be configured to control components 22a–e of the type referred to above. More particularly, a touch panel display comprises or contains a graphical display unit (GDU) 27, which is a symbol or other viewable indication located at a specific region upon screen 28 of touch panel 25. Control is implemented by touching the screen 28 at the specific region. Once a user creates a touch panel display, a file containing the information relating to the touch panel display is transferred from the user computer 15 to the touch panel 25 via the master controller 20. After touch panel 25 receives the file, the touch panel executes the file and builds a touch panel display.

Figure 2:
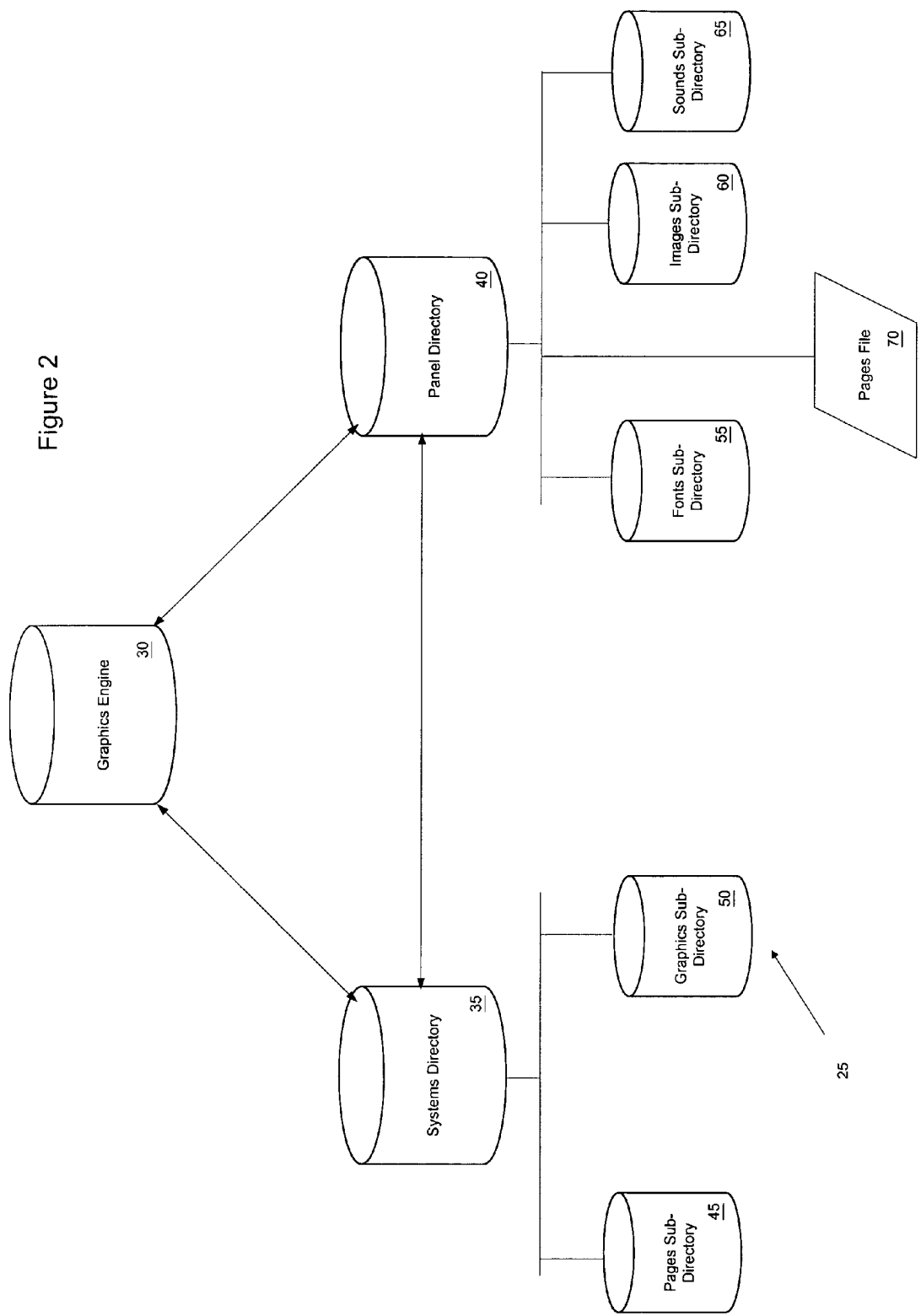
FIG. 2 is a system schematic diagram illustrating the relationships between internal components of a touch panel in accordance with the present invention.

FIG. 2 is a diagram showing the operational components within the touch panel. The operational components control the functions of the touch panel display. The operational components also process the information received from the user computer 15 through the master controller 20. The operational components interact with the master controller 20 to relay user instructions from the touch panel to the devices controlled by the master controller 20. The operational components include one or more graphics engines 30. The graphics engine 30 allows the touch panel to process the information received from the computer 15. The graphics engine 30 also allows the touch panel to build panels such as 24 and 26 for display on the touch screen, pages for display on the touch screen, graphical display units (GDUs), and other similar graphical information used by the touch panel. A panel is a set of pages that is used by the touch panel to display user interface information, both interactive control information, i.e. device controls, and non-interactive, non-control information. The user creates panels by means of the user computer 15.

Panels consist of one or more pages. A page is a single informational window displayed by the touch screen. Contained within the pages are one or more GDUs and one or more sub-pages. A GDU is an informational display created to allow the user of a touch panel to control the various components communicatively connected to the master controller 20. Each GDU has two or more states. A state is the operational position of the GDU. In other words and by way of example, a GDU may have two states—on and off. In the on state, the GDU may appear to be one color, while in the off state, the GDU appears as a different color. Each state of a GDU is a different image that is built by the graphics engine 30. Thus, if a GDU has 100 states, then the GDU has 100 associated images. Sub-pages may comprise, for example, video feeds from a camera in communication with the master controller 20 and the touch panel 25. These sub-pages are displayed to the user as windows within the page itself. Sub-pages may also have an associated state.

Communicating with the graphics engine 30 is a systems directory 35 and a panel directory 40. The systems directory 35 and the panel directory also are in communication with each other. The systems directory 35 includes a pages subdirectory 45 and a graphics subdirectory 50. The pages subdirectory 45 can be used to store information concerning the various resolution LCD screens used to build touch panels. It will be appreciated that one of ordinary skill in the art would recognize the various resolutions associated with commercially available LCD screens. The graphics subdirectory 50 contains information concerning known images, fonts, and other similar graphics information.

The panel directory 40 includes a fonts subdirectory 55, an images subdirectory 60, and a sounds subdirectory 65. The fonts subdirectory 55 contains standard fonts recognized and stored by the graphics engine 30. The images subdirectory 60 contains various images, such as bitmaps, icons, and other similar types of images recognized and stored by the graphics engine 30. The sounds subdirectory 65 contains all sounds recognized and stored by the graphics engine 30. The panel directory 40 also includes a pages file 70. The pages file 70 is created when the user uploads panel files from the user computer 15. After the upload, the pages file 70 will contain all information necessary for the graphics engine 30 to make the pages, GDUs, and sub-pages respectively available to the touch panel screen.

Figure 3:
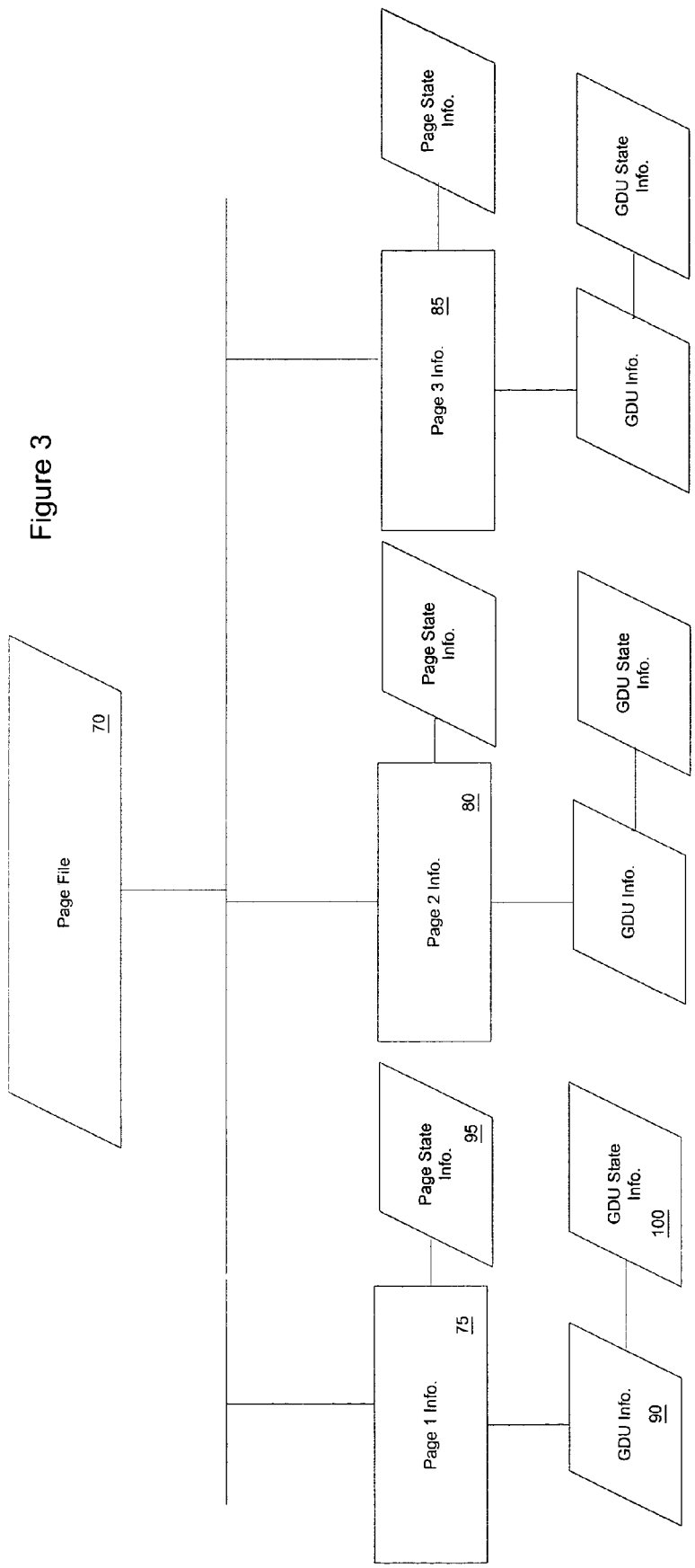
FIG. 3 is a system block diagram illustrating the information contained within a page file of the present invention.

FIG. 3 shows a schematic breakdown of the page file 70 located within the panel directory 40. The page file 70 can contain page information files concerning one or more pages, such as those depicted as 75, 80, and 85 respectively. Each page information file, 75, 80, and 85, includes instructional information to be used by the graphics engine 30 to build and display pages, GDUs, and sub-pages. The instructional information can include information concerning the state of the page as shown by block 95. Block 90 shows that the instructional information can also include information concerning the GDUs. Contained with the GDU information is information concerning the state of the GDU, as shown by block 100. From the information contained within the page information file, a page, and the GDUs and other components of the page, can be built and displayed.

Figure 4A:
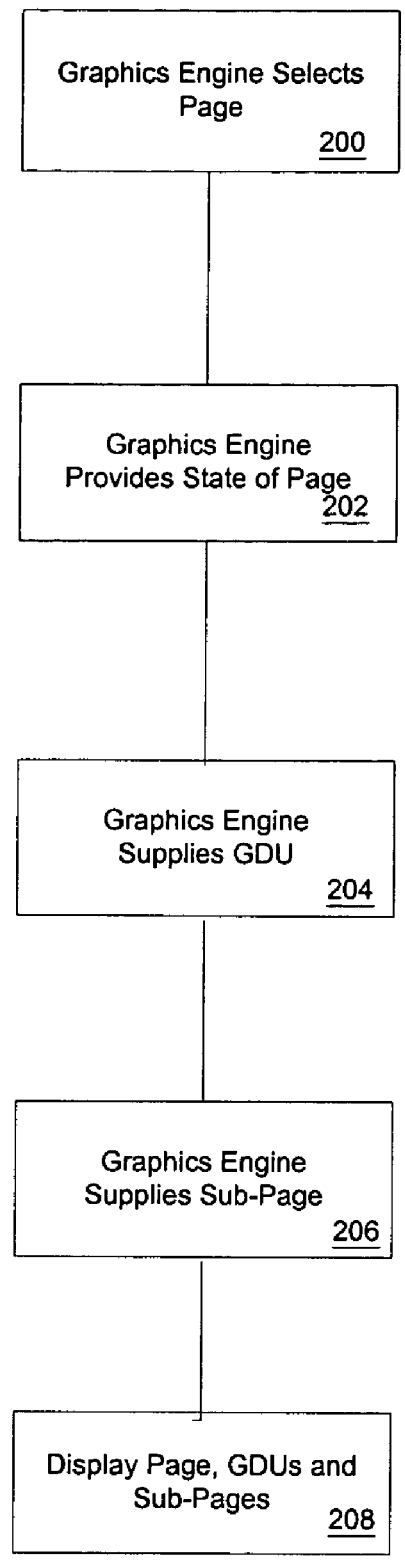
FIGS. 4A–4D collectively provide a flow diagram of the general steps of creating and displaying a page on a touch panel in accordance with the present invention.
Figure 4B:
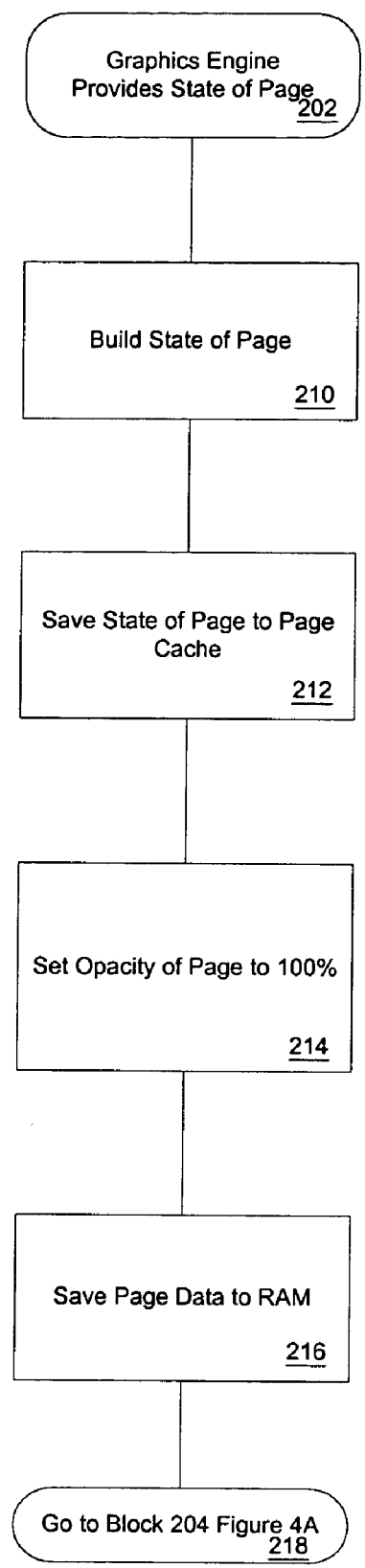

FIGS. 4A–4D show the method by which a touch panel builds a page. FIG. 4A provides a flow diagram of the general operational steps of the touch panel. Block 200 shows that once the page files are established, the graphics engine selects a page for building, based upon user established settings and/or user commands. The graphics engine first provides the state of the page, as shown by block 202. After the graphics engine provides the state of the page, the graphics engine supplies the GDUs needed for the page selected, as shown by block 204. Once the GDUs are supplied, the graphics engine supplies the sub-pages needed for the page selected as shown by block 206. It should be appreciated that each page can contain one or more GDUs and one or more sub-pages. Upon constructing or creating the page together with its GDUs and sub-pages, the graphics engine displays the page. The GDUs and sub-pages may be displayed either simultaneously with the page or upon command of the touch panel user. FIG. 4B further details the operational step of providing the state of the page as shown at block 202 in FIG. 4B. Once a page is selected, the graphics engine builds the state of the page as shown by block 210. After building the state of the page it is saved to the page cache as shown by block 212. The graphics engine next sets the opacity of the page to 100% opacity, as shown by block 214. The graphics engine then stores the page data created into random access memory (RAM), as shown by block 216. Once the operational steps of providing the state of the page are completed, the graphics engine turns to supplying GDUs associated with the page, as shown by block 218

Figure 4C:
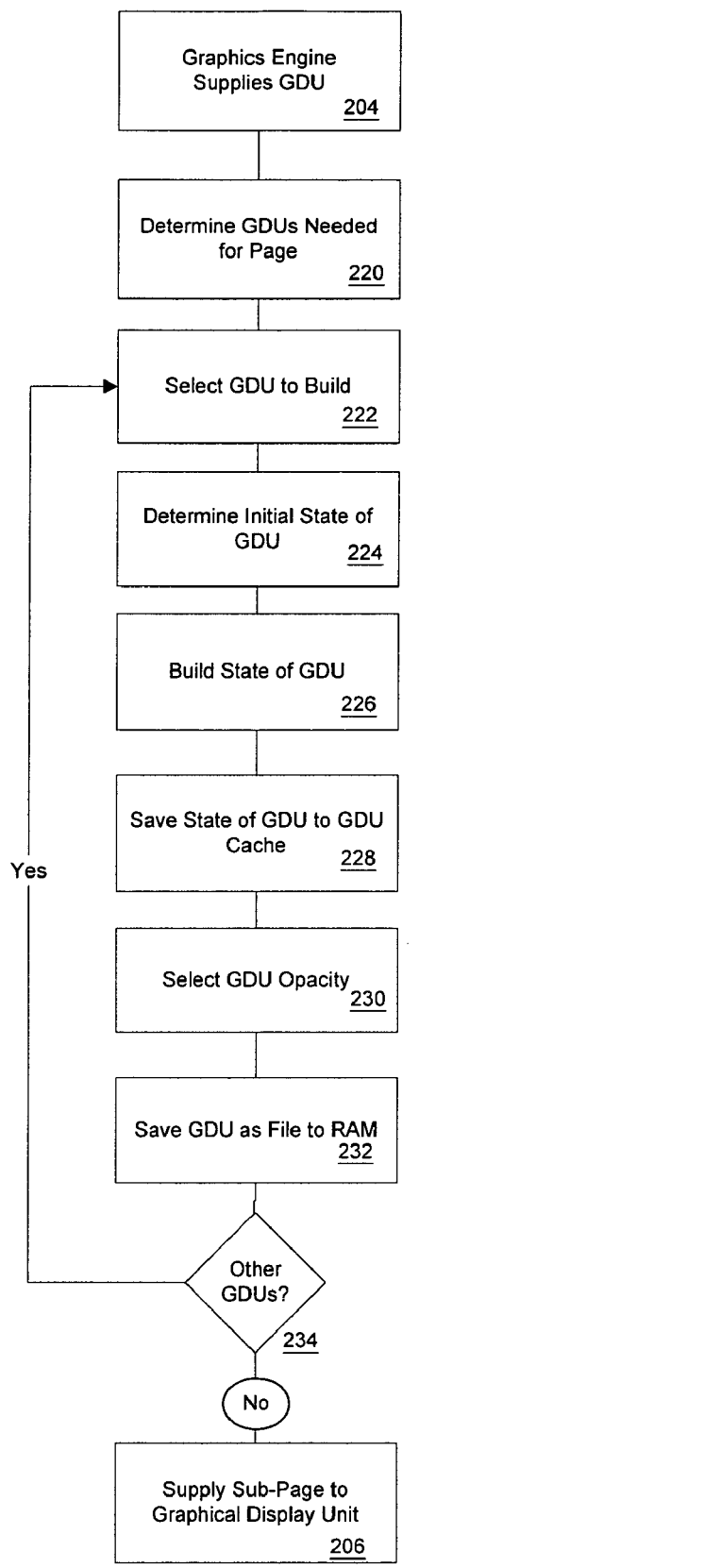

FIG. 4C further details the operational step of supplying the GDUs associated with the page, as shown by block 204 of FIG. 4A. Initially, the graphics engine determines the GDUs required for display with the pages as shown by block 220. The graphics engine then selects a GDU to build, as shown by block 222

After a GDU is selected, the graphics engine determines the state of the GDU and builds that state, as shown by blocks 224 and 226. Once the state of the GDU is built, the graphics engines stores the state of the GDU in a GDU cache, as shown by block 228. The GDU cache is maintained within touch panel memory. After the state of the GDU is saved to the GDU cache, the graphics engine sets the overall opacity of the GDU, as shown by block 230. The opacity of the GDU determines the transparency of the GDU. In other words, some GDUs may be solid and some GDUs may allow objects underneath the GDU to be seen.

After setting the GDU opacity, block 232 shows that the graphics engine delivers the GDU data to RAM of the touch panel. After delivering the GDU data to RAM, the graphics engine determines whether other GDUs need building, as shown by block 234. If other GDUs require building, then the steps of the process are repeated beginning with block 222. If no other GDUs require building, then the graphics engine proceeds to supply sub-pages associated with pages as shown by block 206 of FIG. 4A. A sub-page may be, for example, a video window, or a window with operational GDUs.

Figure 4D:
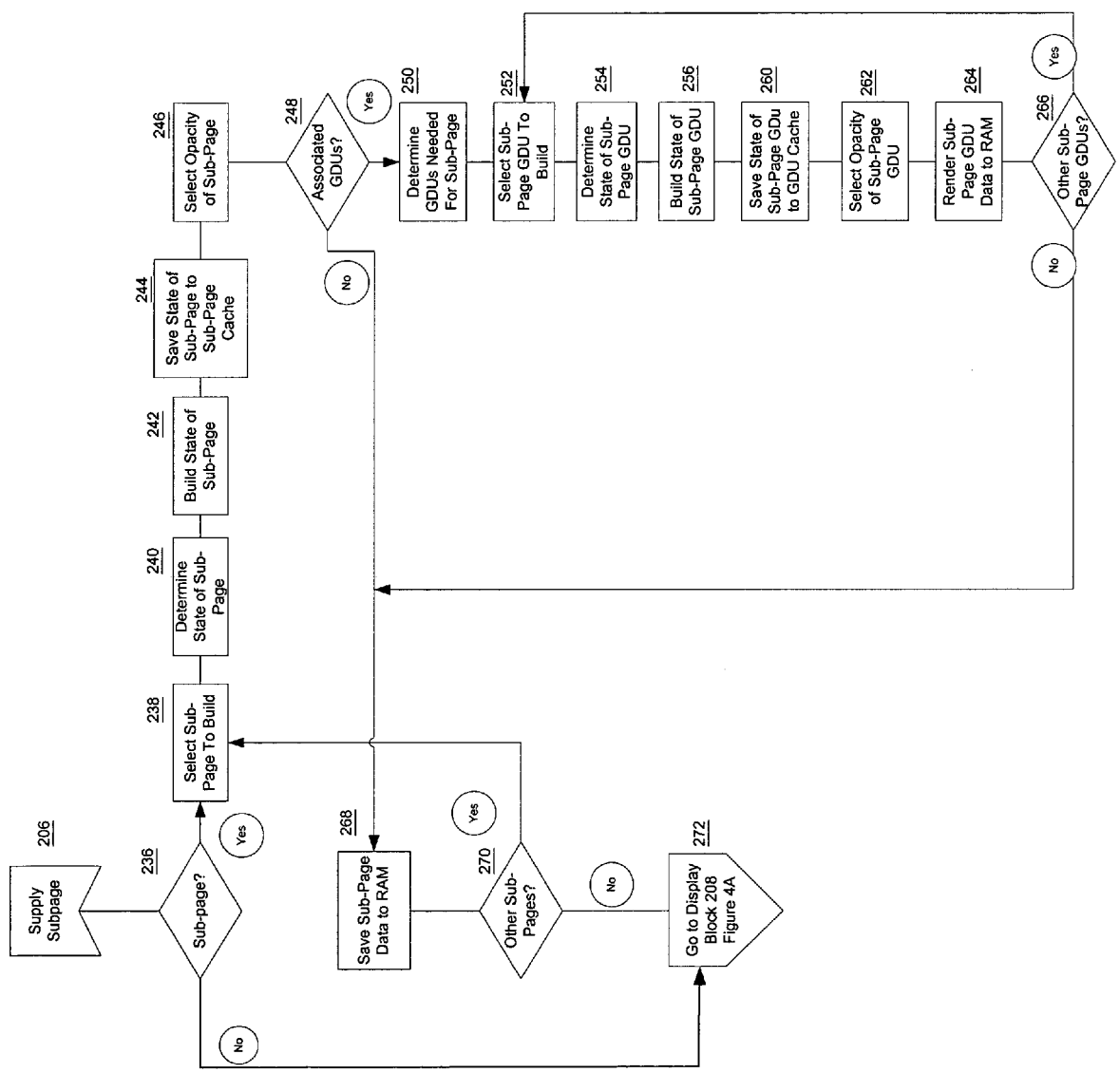

In supplying sub-pages, the graphics engine first determines if the page has associated sub-pages, as in block 236 of FIG. 4D. If the page has associated sub-pages, the graphics engine selects a sub-page to build, as shown by block 238. Next, the graphics engine determines the state of the sub-page, as shown by block 240. After determining the state of the sub-page, the graphics engine builds the state of the sub-page, as shown by block 242. The state of the sub-page is then saved to the sub-page cache, as in block 244. Once the sub-page is saved, the graphics engine selects the opacity of the sub-page, as in block 246. Thereafter, the need for associated GDUs is considered, block 248. If another GDU is needed, the graphics engine then determines the GDUs needed for the sub-pages as in block 250. The graphics engine then selects a sub-page GDU to build, as in block 252. Once selected, the graphics engine determines the state of the sub-page GDU, as in block 254, and the state of the sub-page GDU is built, as in block 256. After building the sub-page GDU, the sub-page GDU is saved to the GDU cache as in block 260. Next, the opacity of the GDU is selected, as in block 262. Once the graphics engine selects the opacity, the graphics engine stores the sub-page GDU data in RAM, as in block 264. The graphics engine then determines whether other sub-pages exist which require building, as shown by block 266. If other sub-page GDUs exist, then the steps of the process for building sub-page GDUs are repeated beginning with block 252. If no other sub-page GDUs require building, then the graphics engine stores the sub-page data to RAM, as shown by block 268. Next, the graphics engine determines if other sub-pages need building, as shown by block 270. If other sub-pages require building, then the graphics engine repeats the steps described above beginning with block 238.

Figure 5:
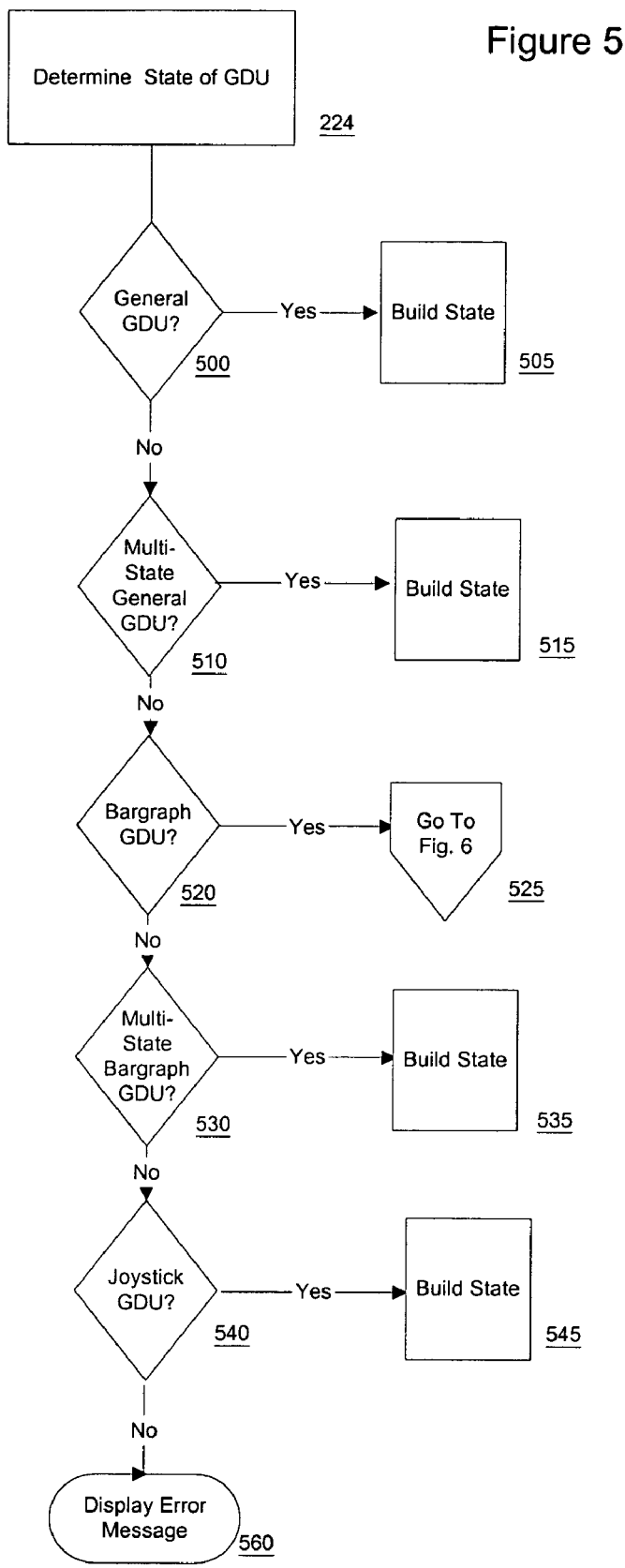
FIG. 5 is a flow diagram of the general steps for determining the state of a graphical display unit of the present invention.
Figure 6:
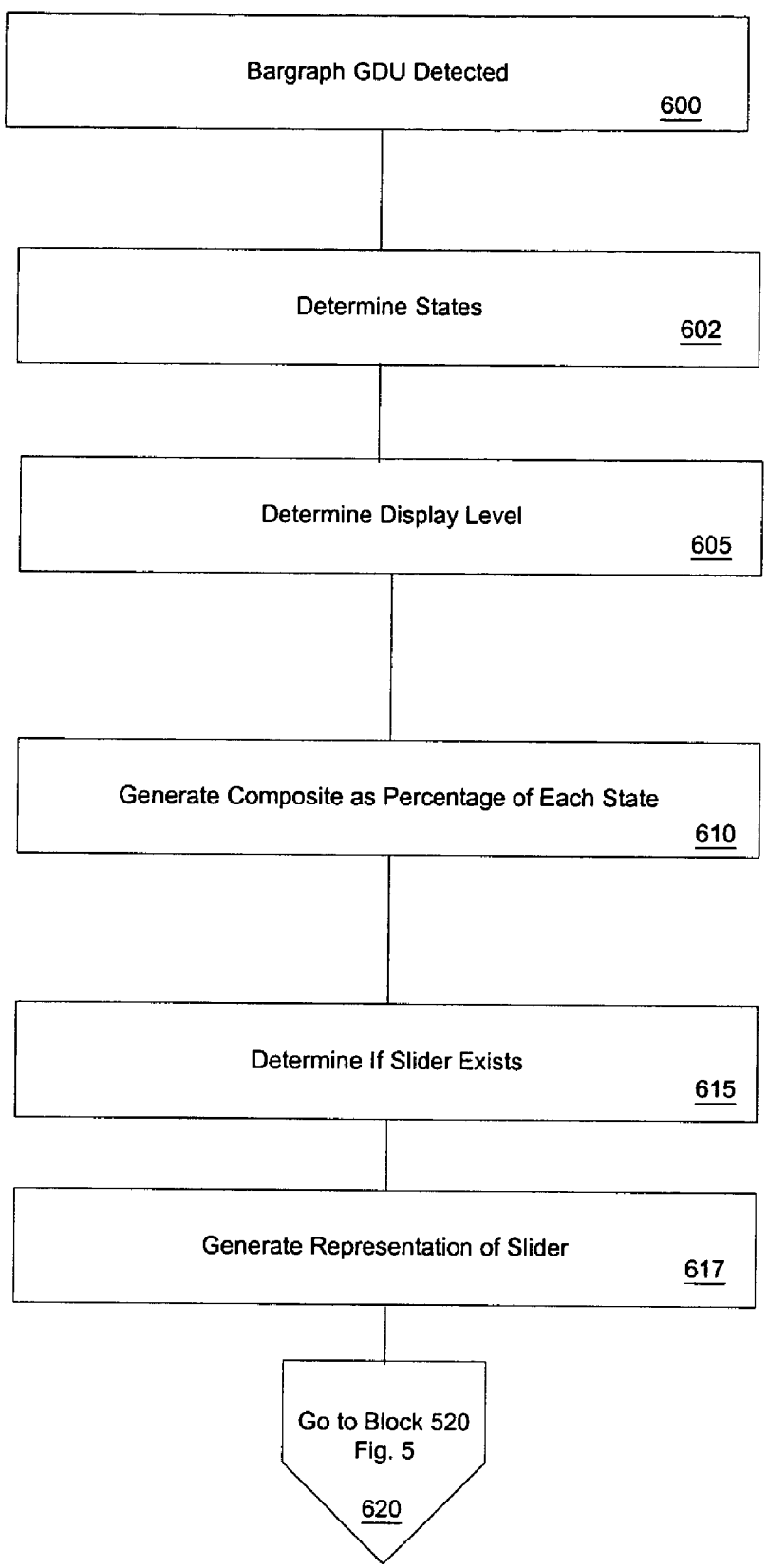
FIG. 6 is a flow diagram for the general steps of determining the state of a graphical display unit comprising a bargraph in accordance with the present invention.

FIGS. 5–6 provide a more thorough description of block 224 of FIG. 4 for determining the initial state of a GDU. FIG. 5 shows the general steps in determining the state of a GDU. To begin, the type of GDU is determined. Although FIG. 5 shows six specific types of GDUs, it will be appreciated by one of skill in the art that other types of GDUs may exist. In determining the type of GDU to be built, each type of GDU is examined, if necessary. Under this process, the graphics engine determines whether the GDU is a general GDU, as shown by block 500. If the GDU is a general GDU, that is, has only two possible states, then the graphics engine builds the state of the general GDU as shown by block 505. If the GDU is not a general GDU, then the graphics engine determines if the GDU is a multi-state general GDU, that is, has more than two states, as in block 510. If the GDU is a multi-state general GDU, then the graphics engine builds the state of the multi-state general GDU as shown by block 515. If the GDU is not a multi-state general GDU, that is, may have more than two states, then the graphics engine determines whether the GDU is a bargraph GDU, as shown by block 520. If the GDU is a bargraph GDU, then the graphics engine builds the GDU based upon the steps shown in FIG. 6, as shown by block 525. If the GDU is not a bargraph GDU, the graphics engine then determines whether the GDU is a multi-state bargraph GDU, as shown by block 530. If the GDU is a multi-state bargraph GDU, then the graphics engine builds the multi-state bargraph GDU built as shown by block 535. If the GDU is not a multi-state bargraph GDU, the graphics engine then determines whether the GDU is a joystick GDU, as shown in block 540. If the GDU is a joystick GDU, the graphics engine builds the joystick GDU, as shown by block 545. If the GDU is not a joystick GDU, then an error message is displayed, as shown by block 560. It should be appreciated that other GDUs may exist that would continue the process until either the correct GDU is found or an error message is displayed.

FIG. 6 further illustrates the process for determining the state of a bargraph general GDU. Once a bargraph GDU is detected, the graphics engine determines the two states of the bargraph GDU, as in block 602. After the states are determined, block 605 shows that the graphics engine determines the display level for the bargraph GDU. A bargraph GDU has two associated states. The display level of a bargraph GDU can be represented as a composite of each of the two associated states. For example, a horizontally oriented bargraph (not shown) could have a first state made up of 100% blue, and a second state made up of 100% red. The first and second states could be combined so that the bargraph is a composite of the first state and the second state wherein, for example, 75% of its area is blue and 25% of its area is red.

After the display level is determined, block 610 shows that the graphics engine generates a composite that is a percentage of each state associated with the bargraph GDU. Next, the graphics engine determines if the bargraph GDU has a slider, as shown by block 615. A slider is a graphical representation used to depict the display level position of the bargraph GDU. If a slider exists, a representation thereof is generated, as shown in block 617. Once blocks 605 through 615 are completed, the bargraph GDU is built, as shown by block 620. For the above example, the slider would be shown at a horizontal position along the bargraph so that 75% of the area of the bargraph, on one side of the slider, would be blue, and 25% of the area, on the other side, would be red.

Figure 7:
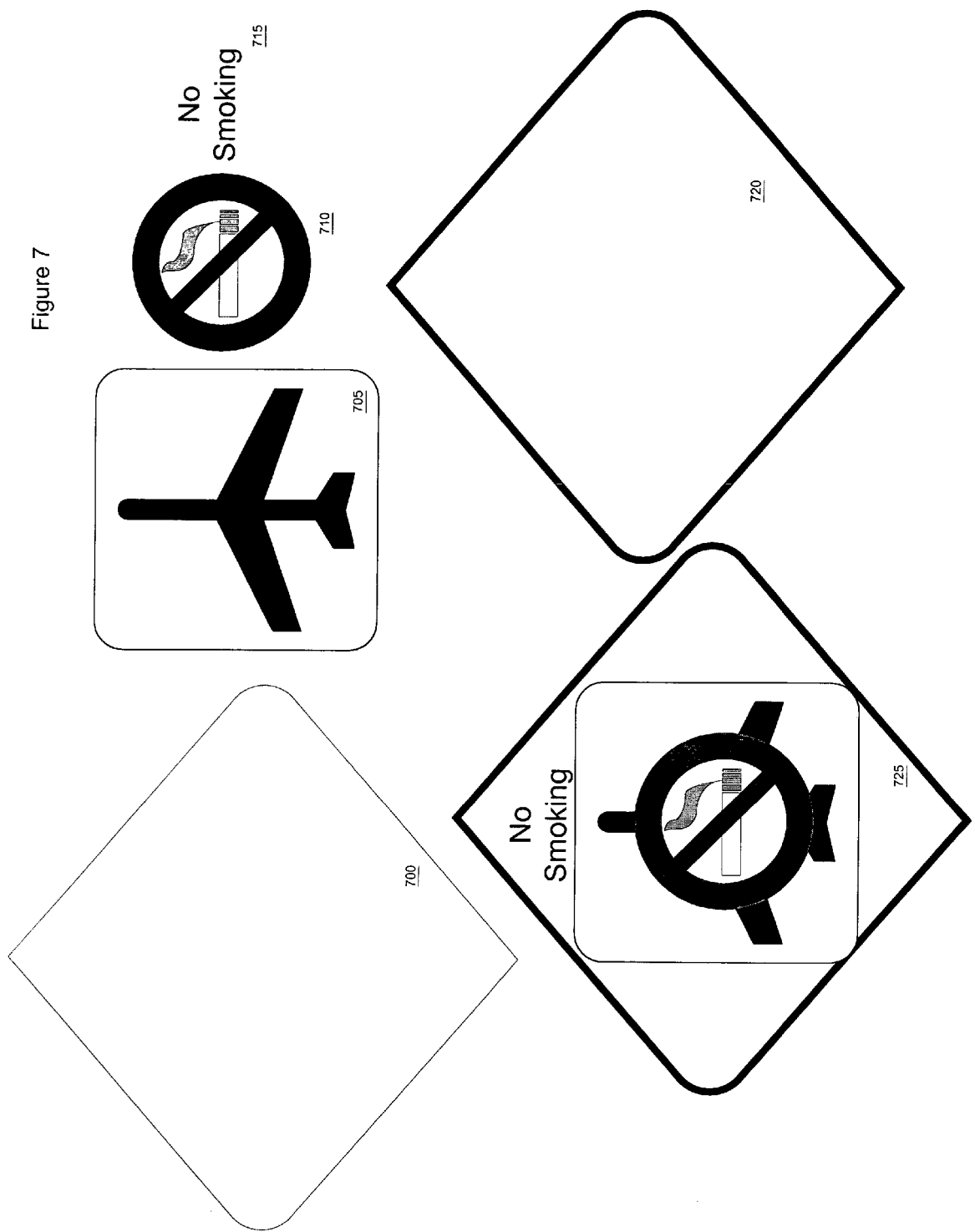
FIG. 7 is a diagram showing the construction of a graphical display unit of the present invention.

FIGS. 7–13 further explain block 226 of FIG. 4C for building the state of a GDU. FIG. 7 shows a diagram illustrating the construction of a GDU. As shown in FIG. 7, the GDU is first sized to the appropriate dimensions, as shown by 700. After sizing the graphical display unit and adding color, a bitmap 705 is generated for placement within the GDU dimensions 700. The actual construction and placement of the bitmap 705 will be discussed hereinafter. An icon 710 can next be generated for placement within the GDU 700. Again, the actual capturing and placement of the icon will be discussed hereinafter. After the icon is generated, lines of text 715 are positioned on the GDU 700. Finally, a border 720 can be generated for the GDU 700. The construction and placement of the lines of text 715 and the border 720 are discussed infra. The result of these steps is a fully constructed GDU 725. It will be appreciated that not every GDU will include a bitmap, icon, text and a border. It will also be appreciated that while this embodiment of the invention uses these components, other components may exist that could be provided for the GDU.

Figure 8:
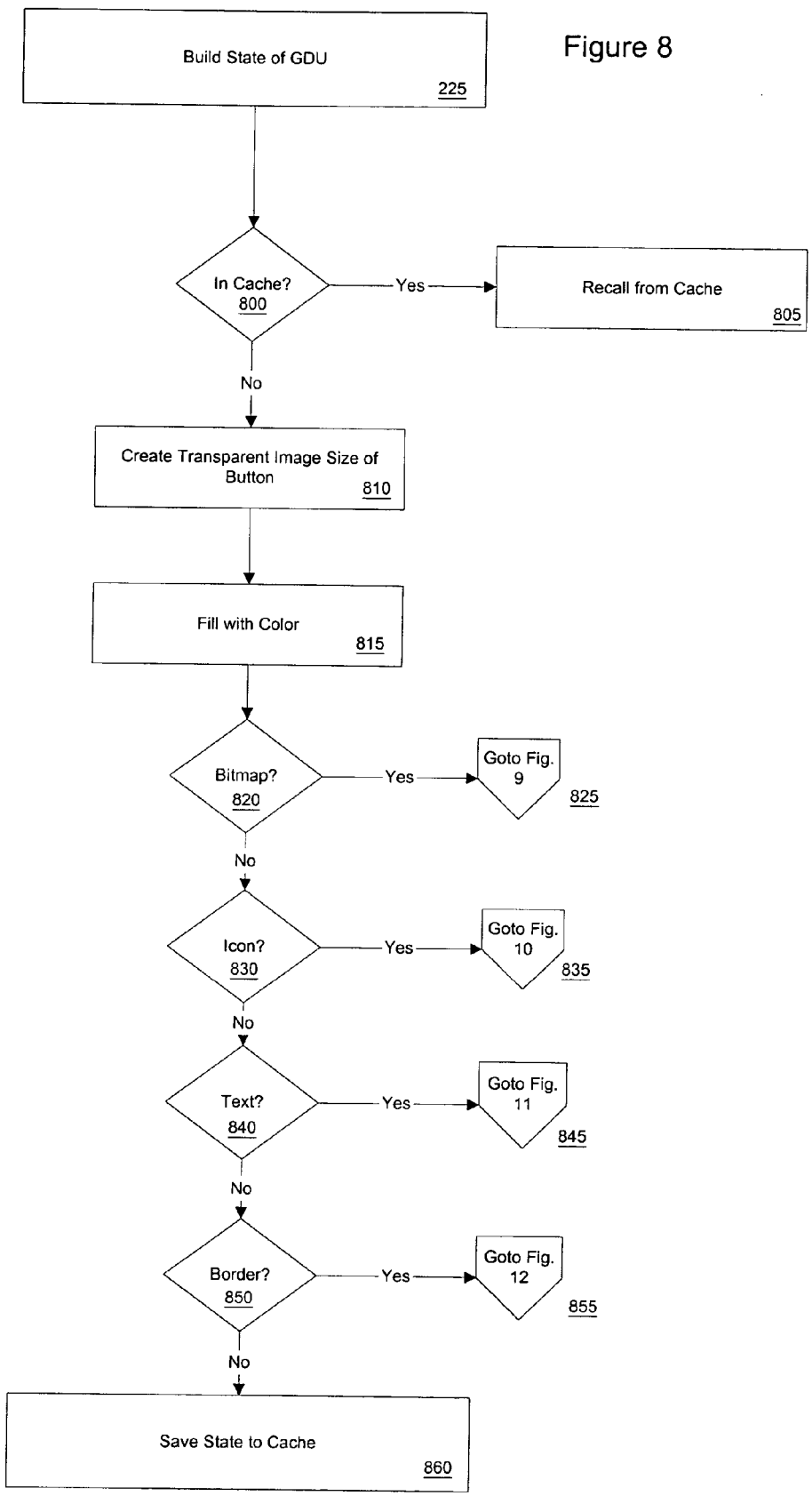
FIG. 8 is a flow diagram of the general steps for building the state of a graphical display unit of the present invention.
Figure 9:
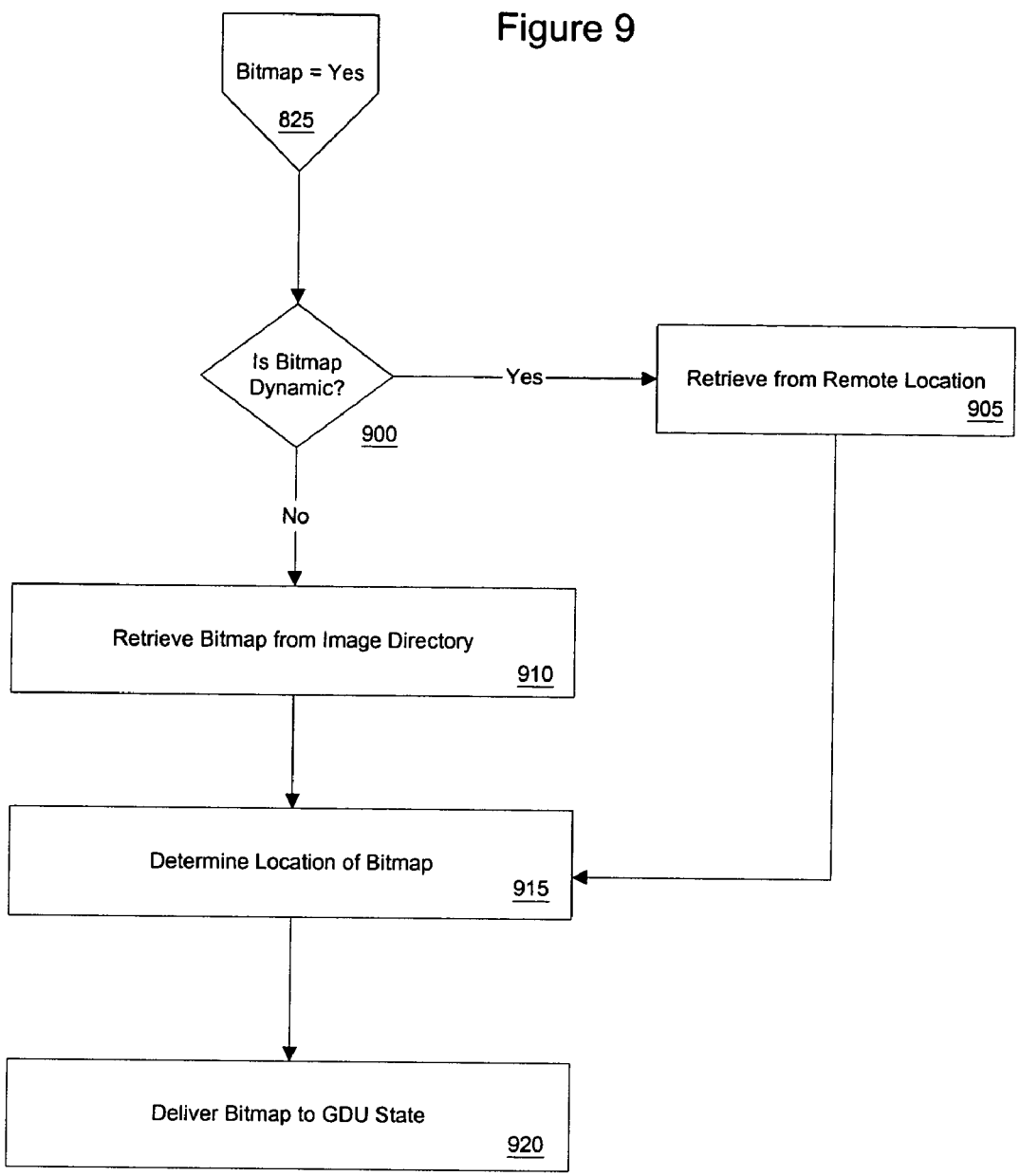
FIG. 9 is a flow diagram of the general steps for providing a bitmap for a graphical display unit of the present invention.

FIG. 8 shows the general process for building the state of a GDU. Once the type and state of the GDU are determined, the graphics engine analyzes the GDU cache to determine if the GDU has been previously built, as shown by block 800. The GDU cache is a database that stores all GDU states previously built. If the GDU has been previously built, then it is recalled from the GDU cache, as shown by block 805. If the GDU is not in the GDU cache, then the graphics engine creates a transparent image of the GDU, as shown by block 810. The transparent image provides the relative dimensions of the GDU. After the transparent image is created, block 815 shows that the graphics engine determines the color, or colors associated with the GDU and fills the transparent image with the appropriate colors.

Next, the graphics engine determines whether the GDU has an associated bitmap, as shown by block 820. If the GDU has an associated bitmap, the bitmap is retrieved from a bitmap database stored in RAM and furnished to the GDU, as shown by block 825. Once the graphics engine begins operating the page file in the panel directory, the graphics engine creates the bitmap database. If the GDU does not contain a bitmap or once the bitmap has been retrieved and furnished, then the graphics engine determines whether the GDU has an associated icon, as shown by block 830. If the GDU contains an icon, then the icon is retrieved and furnished to the GDU, as shown by block 835. If the GDU does not contain an icon or once the icon has been retrieved and furnished, then the graphics engine determines whether the GDU has any associated text, as shown by block 840. If the GDU has an associated line of text, then the line of text is built and furnished to the GDU, as shown by block 845. If the GDU does have text or once the text has been built and furnished, then the graphics engine determines whether the GDU has an associated border, as shown by block 850. If the GDU has a border, then the border is built and furnished to the GDU, as shown by block 855. If the GDU does have a border or once the border has been built and furnished, then the built GDU is saved to the GDU cache, as shown by block 860.

FIGS. 9–13 further illustrate processes for creating a GDU through the creation of bitmaps, icon, text, and borders. Once it is determined that a bitmap is needed, the dynamic nature of the bitmap is determined, as shown by block 900, in FIG. 9. A dynamic bitmap is one that is retrieved from a remote location, for example the Internet, a remote storage device, or other similar means, rather than being stored in the images subdirectory 60 of the panel directory 40 of FIG. 2.

If it is determined that the bitmap is dynamic, then the graphics engine retrieves the bitmap from the remote location where it is stored using the master controller 20 as shown in block 905. Once the bitmap is retrieved from the remote location, the graphics engine determines the location of the bitmap on the GDU, as shown by block 915. After the location of the bitmap is determined, the bitmap is provided or delivered to the GDU, as shown by block 920. If the bitmap is not dynamic, then block 910 shows that the graphics engine retrieves the bitmap from the images subdirectory 60. Once the bitmap is retrieved from the images subdirectory, then block 915 shows that the graphics engine determines the location of the bitmap on the GDU. After determining the location of the bitmap, the bitmap is delivered to the GDU, as shown by block 920.

Figure 10:
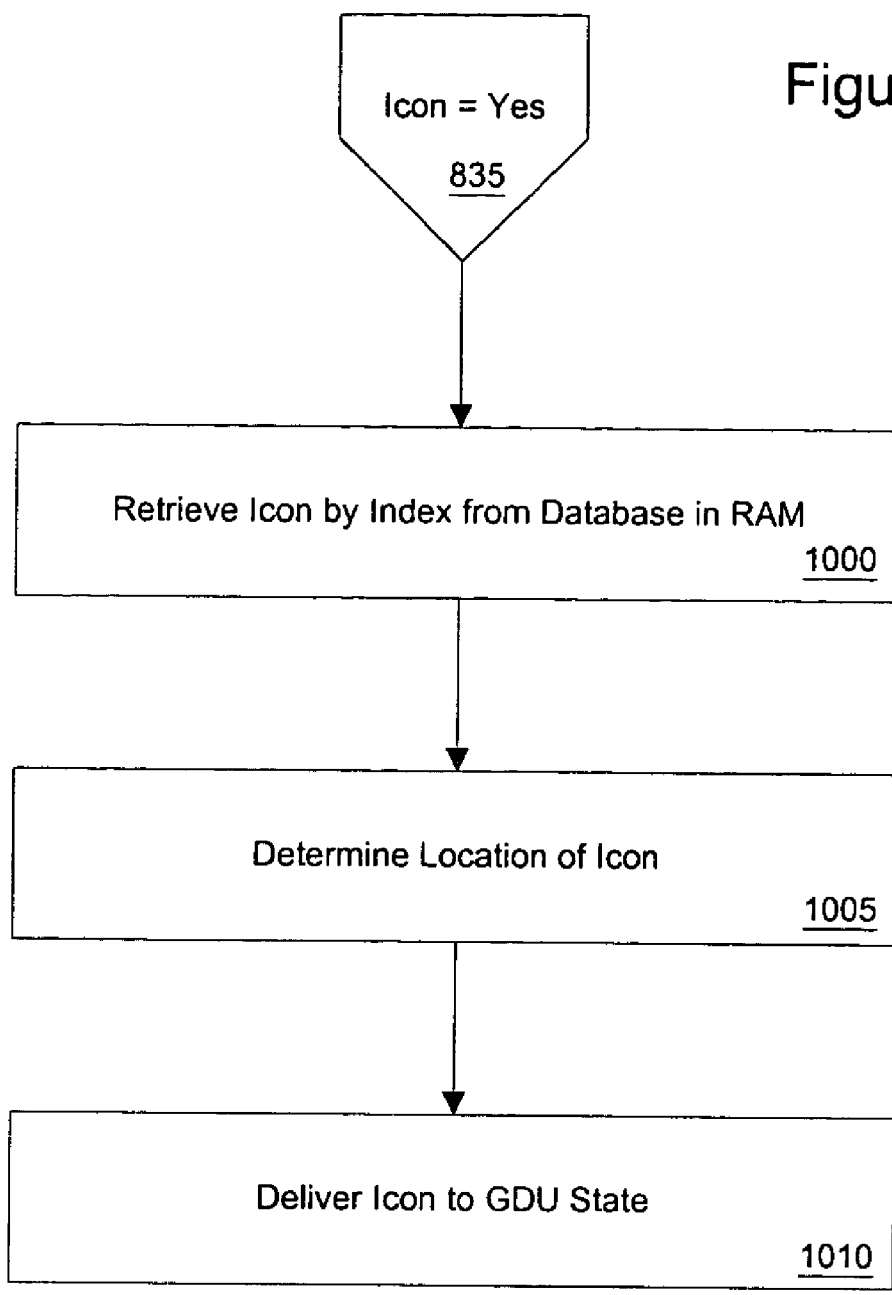
FIG. 10 is a flow diagram of the general steps for providing an icon for a graphical display unit of the present invention.

Once it is determined that an icon is associated with the GDU, the graphics engine retrieves the icon from an icon database contained in RAM, as shown by block 1000 of FIG. 10. The icon database is created once a page file becomes operational. The icon database is indexed such that each icon needed for a GDU can be found by referring to its place in the index. Once the icon is retrieved from the database, block 1005 shows that the graphics engine determines the location of the icon on the GDU. After determining the location of the icon, the icon is delivered to the GDU, as shown by block 1010.

Figure 11:
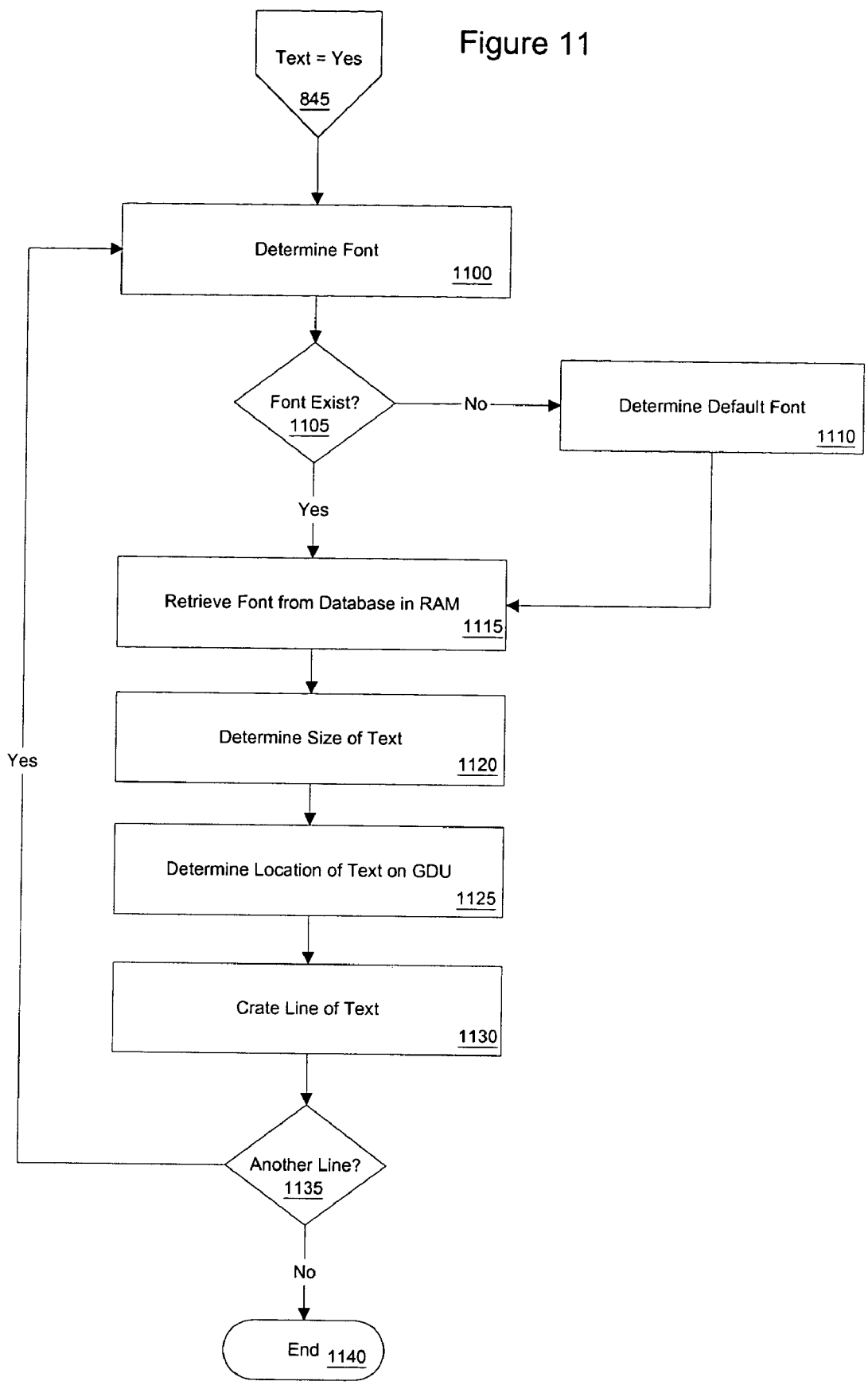
FIG. 11 is a flow diagram of the general steps for providing text for a graphical display unit of the present invention.

Once a determination is made that the GDU contains a line of text, block 1100 of FIG. 11 shows that the graphics engine determines the font associated with the line of text. Once the appropriate font is determined, the graphics engine determines whether the font exists in the font database, as shown by block 1105. Block 1110 shows that if the font is not found, then a default font is chosen and the default font is retrieved from the font database, as shown by block 1115. If the font does exist in the font database, then the graphics engine retrieves the font from the font database, as shown by block 1115. Once the font is retrieved, the line of text is sized, as shown by block 1120. Determining the size of the text assists in determining the location of the text on the GDU. After determining the size of the text, the graphics engine determines the location of the text on the GDU, as shown by block 1125.

After determining the location of the text on the GDU, the line of text is created and positioned on the GDU, as shown by block 1130. Once a line of text is positioned on the GDU, the graphics engine determines whether another line of text is associated with the GDU, as shown by block 1135. If another line of text is associated with the GDU, then blocks 1100 through 1130 are repeated. These steps are repeated until all lines of text have been created and positioned onto the GDU, as shown by block 1140.

Figure 12:
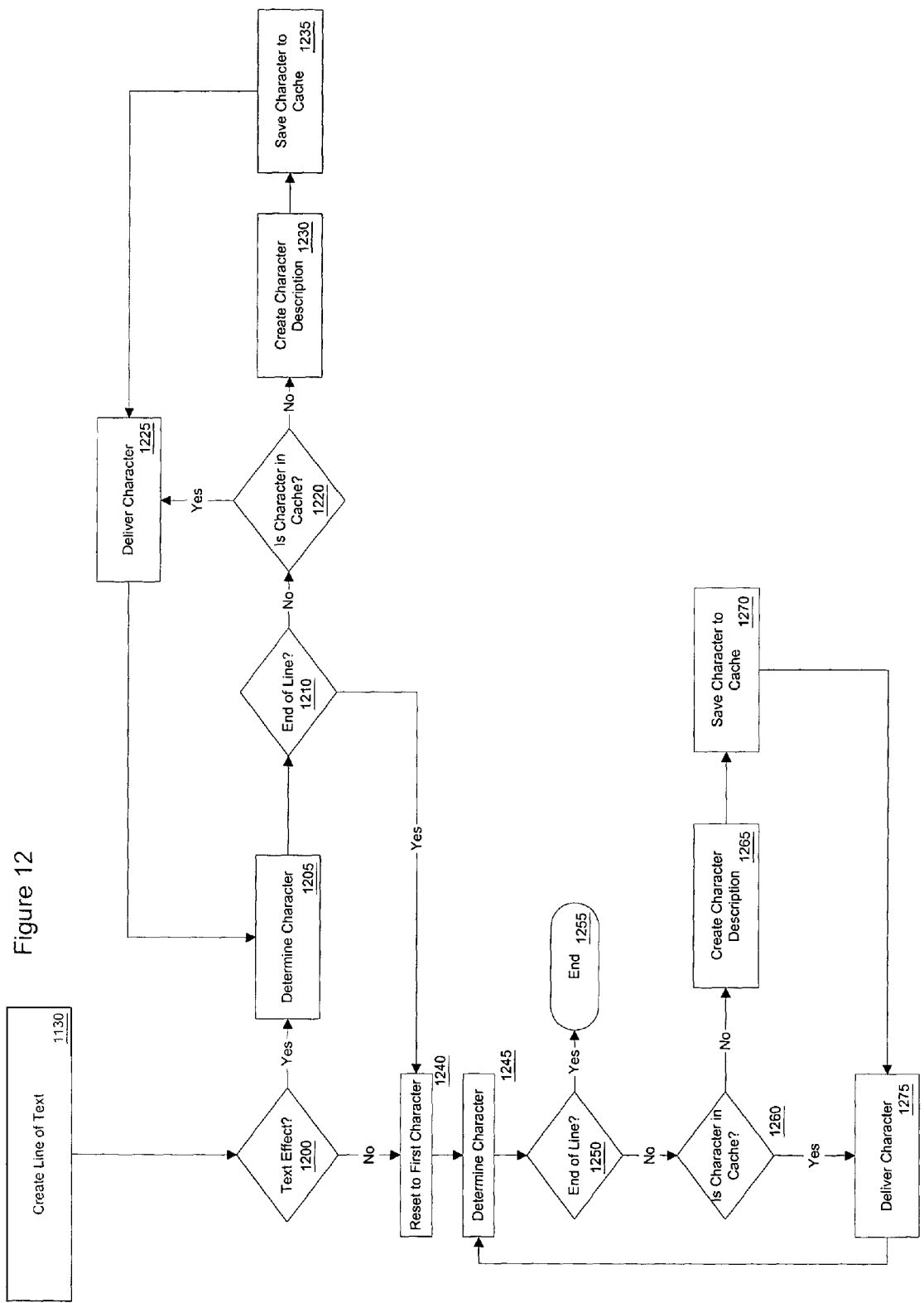
FIG. 12 is a flow diagram of the general steps for providing a line of text in accordance with the present invention.

FIG. 12 further illustrates the provision or creation of a line of text, as shown by block 1130 in FIG. 11. In providing a line of text, the graphics engine determines whether the text has an associated text effect. A text effect is a special feature of the text that makes the text more prominent or changes the appearance of the text, i.e., gives the text depth. An example of a text effect would be a shadowing feature. If the line of text has an associated effect, then the graphics engine determines the first character in the line of text, as shown by block 1205. Once the character is determined, the graphics engine determines whether the character is an end of line character, as shown by block 1210. An end of line character is a marker that specifies the completion of a line of text.

If the character is not an end of line character, then the graphics engine determines whether the character with the appropriate effect is stored in the effect cache, as shown in block 1220. The effect cache is a database containing all characters with effects that have been previously built. If the character with the appropriate effect is stored in the effect cache, then the character and effect are delivered to the GDU, as shown by block 1225 and the next character is determined, as shown by block 1205.

If the character with appropriate effect is not stored in the effect cache, then the graphics engine creates a description of the character and effect, as shown by block 1230. Block 1235 then shows that the description of the character and the effect are saved to the effect cache after which the character effect is delivered to the GDU, as shown by block 1225. The graphics engine then determines the next character, as shown by block 1205.

If the character is an end of line character, then the effects for the line of text have all been provided, and the line of text is reset to the first character to generate actual text characters, as shown by block 1240. Block 1245 shows that the graphics engine again determines the character. After the character is determined, the graphics engine again determines whether the character is an end of line character, as shown by block 1250. If the character is an end of line character, the line of text is complete, as shown by block 1255. If the character is not an end of line character, then the character cache is checked to determine if the character exists, as shown in block 1260. Like the effect cache, the character cache is created once the graphics engine has built characters. If the character is not stored in the character cache, then block 1265 shows that the graphics engine creates a character description for the character after which the character is stored in the character cache, as shown in block 1270. After the character is stored in the character cache, the character is retrieved and delivered to the GDU, as shown by block 1275 and the next character in the line of text is determined, as shown by block 1245. If the character is stored in the character cache, then the character is retrieved and delivered to the GDU, as shown by block 1275. The next character in the line of text is determined, as shown by block 1245.

Figure 13:
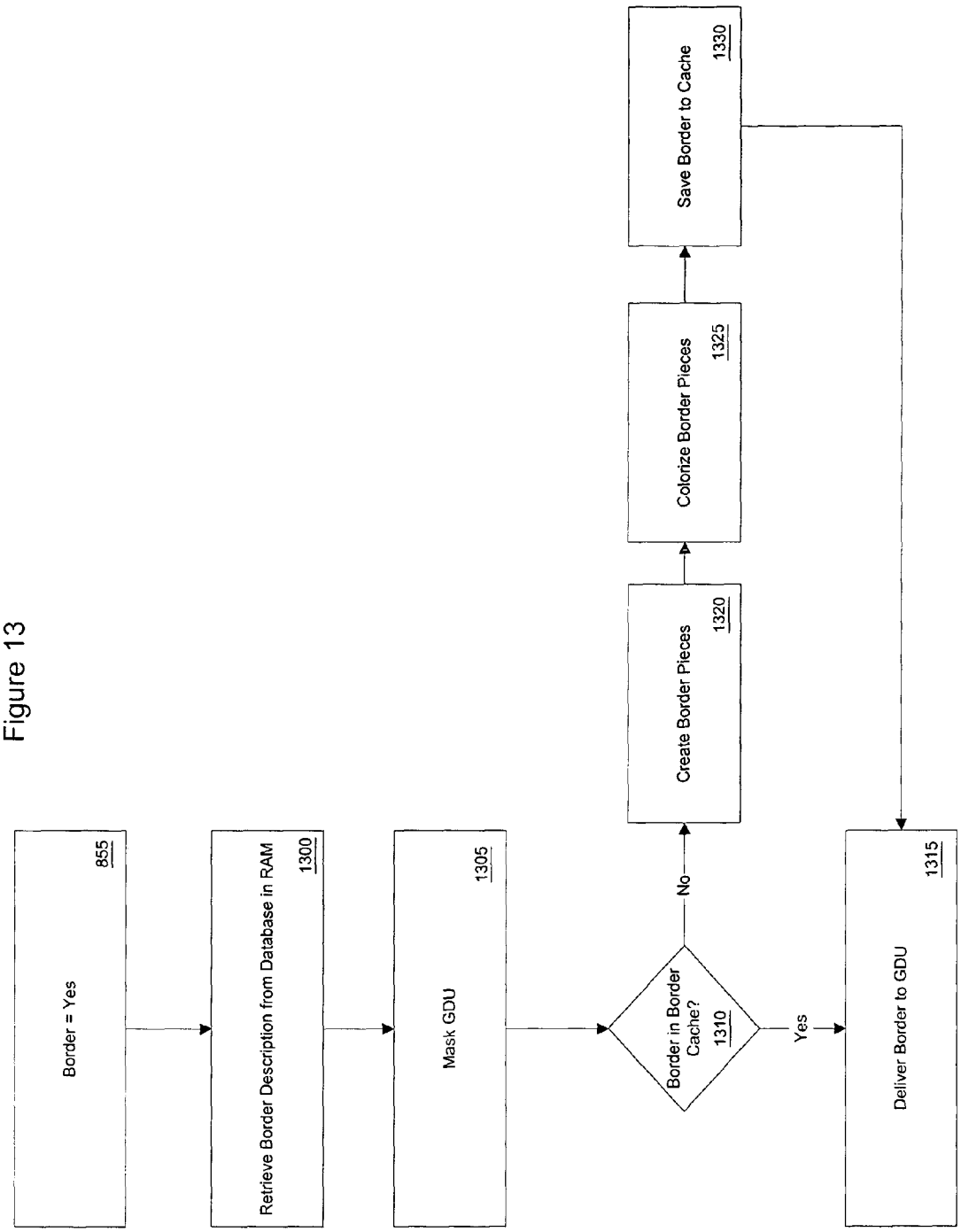
FIG. 13 is a flow diagram of the general steps for providing a border onto a graphical display unit of the present invention.

Once it is determined that the GDU has an associated border, the border description is retrieved from the border database in RAM, as shown by block 1300 of FIG. 13. After the border description is retrieved, the graphics engine masks the GDU, as shown by block 1305. Masking of the GDU allows for the GDU to be shaped appropriately. All GDUs begin as squares. It is through the masking, or cropping process, that a GDU can be formed into other shapes.

After the GDU has been masked, the graphics engine determines whether the border is stored in the border cache, as shown by block 1310. The border cache is created once the graphics engine begins building the borders for GDUs. If the border is stored in the border cache, then the border is retrieved and delivered to the GDU, as shown by block 1315. If the border is not stored in the border cache, then the border pieces are created, as shown by block 1320. Each border is a series of eight or more border pieces. Each piece will cover a particular region of the GDU. Once the border pieces are created block 1325 shows that the border pieces are colorized. Next, the colorized border pieces are stored to the border cache, as shown by block 1330. After storing the border pieces in the border cache, the border pieces are delivered to the GDU, as shown by block 1315.

OPERATION OF TOUCH PANEL

In the operation of touch panels, it has become important to be able to furnish GDUs to the touch panel, such that the GDUs emulate the operational controls for a device associated with and represented by the GDU. For example, a Digital Video Device (DVD) may have a remote control that includes a play button, a reverse button, a fast forward button and a pause button, all within the same general region. A touch panel, to achieve user-friendly operation, should emulate the configuration of the DVD remote control device.

Because all GDUs begin as a square configuration and are then masked or cropped to their display shape, GDUs within close proximity may cause interference with the operations of one another. More particularly, a touch message is the application of pressure to a region of a touch panel screen on which a GDU is displayed. The application of pressure generates a control signal for a purpose associated with the GDU. However, because a GDU remains square even after masking, the areas of adjacent GDUs may overlap, if the GDUs are in close proximity. Thus, a touch message intended for a particular GDU could also apply pressure to a closely spaced adjacent GDU. Accordingly, to prevent this interference, it has been found that an active touch area can be defined for each GDU, for use in discerning between GDUs in close proximity. The active touch area of a GDU will generally be the unmasked area of its corresponding square.

FIG. 14A shows a diamond shaped GDU 1400 with an active touch area 1405. The diamond shaped GDU 1400 is considered square in shape by the touch panel and has a total touch area shown by the dotted square 1410. However, the active touch area 1405 is defined to be only the area within the perimeter of the GDU 1400, with the perimeter being defined by lines 1415, 1420, 1425, and 1430, respectively.

Once a touch message is received by the touch panel, the touch panel determines if the touch message actively touches a GDU. Thus, in FIG. 14A a touch message 1435 is received by the touch panel in the proximity of the GDU 1400, and more specifically within its total touch area 1410. The touch panel mathematically orients a hypothetical line, depicted as YX, between the center (Y) of the GDU and the location of the touch message (X). Next, the touch panel, using the line YX as orientation, mathematically generates a line from the touch message (X) to the edge (A) of the GDU. The touch panel then analyzes each point along the line XA, beginning at the touch message point (X), until the point at the edge of the square (A) is reached. If any point along XA corresponds to the active touch area 1405, then the touch panel activates or operates that GDU. On the other hand, if a point along XA is within total touch area 1410 but not active touch area 1405, the touch panel does not operate that GDU. FIG. 14A shows the message 1435 to be in such non-active area of the GDU 1400. This process allows for GDUs to be positioned on a page such that the minimum spacing between the GDUs may be no more than one pixel in resolution. This process also allows for GDUs to be positioned in close proximity to each other without the detrimental effect of interference due to overlapping areas. Such a configuration is shown in FIG. 14B.

FIG. 14B shows four GDUs of the configuration illustrated in FIG. 14A. Four GDUs, labeled (I), (II), (III), and (IV), are arranged such that the total touch areas of the GDUs overlap. More importantly, the GDUs are arranged in a manner such that the total touch area of one GDU overlaps with the active touch area of another. For example, GDU (I) has an active touch area 1440 and a total touch area 1448. GDU (II) has an active touch area 1442 and a total touch area 1450. As can be seen by this configuration, the total touch area 1448 of GDU (I) overlaps with the active touch area 1442 of GDU (II) at location 1456. Such an overlap can be seen again with reference to GDU (III) and GDU (IV). GDU (III) has an active touch area 1444 and a total touch area 1452. GDU (IV) has an active touch area 1446 and a total touch area 1454. Again, here the total touch area 1454 of GDU (IV) overlaps with the active touch area 1444 of GDU (III) at location 1458. Thus, as can be seen, certain configurations of GDUs will provide overlapping areas of active touch and non-active touch from two separate GDUs. Therefore, a method for discerning which button to operate should a touch message be received from an area of overlap is needed. The present method provides such a method. As shown in FIG. 14B, a touch message 1460, shown by an X, is received by the touch panel. The touch message 1460 is located within a region of overlap where the total touch area of GDU (I) and the active touch area of GDU (IV) overlap. To discern which GDU, if any, is activated by the touch message 1460, the touch panel mathematically plots a line between and the touch message location 1460 and the edge of each GDU, as shown by FIG. 14A. In FIG. 14B, the lines are represented as line XB, which is the line between the touch message 1460 and the edge B of GDU (I), and as line XC, which is the line between the touch message and the edge C of GDU (IV). It should be noted that the touch message location is analyzed with respect to each GDU. However, if the touch message is outside the total touch area for a GDU, then the touch panel determines that the particular GDU has not been hit. In the present example, GDU (II) and GDU (III) fall within this category.

Once the touch panel has mathematically plotted the lines XB and XC, each line is analyzed in the manner described in FIG. 14A to determine whether the touch message is in an active touch area for the respective GDUs. The order in which the lines are analyzed is the order in which the GDUs were created by the graphics engine. Thus, in this instance and by way of example only, GDU (I) and line XB would be analyzed first and GDU (IV) and line XC would be analyzed next. Upon such analysis, the touch panel would determine that the touch message 1460 actively touches GDU (IV), but does not actively touch GDU (I). Thus, GDU (IV) would be activated and the user would not experience interference problems between GDU (I) and GDU (IV).

Figure 15:
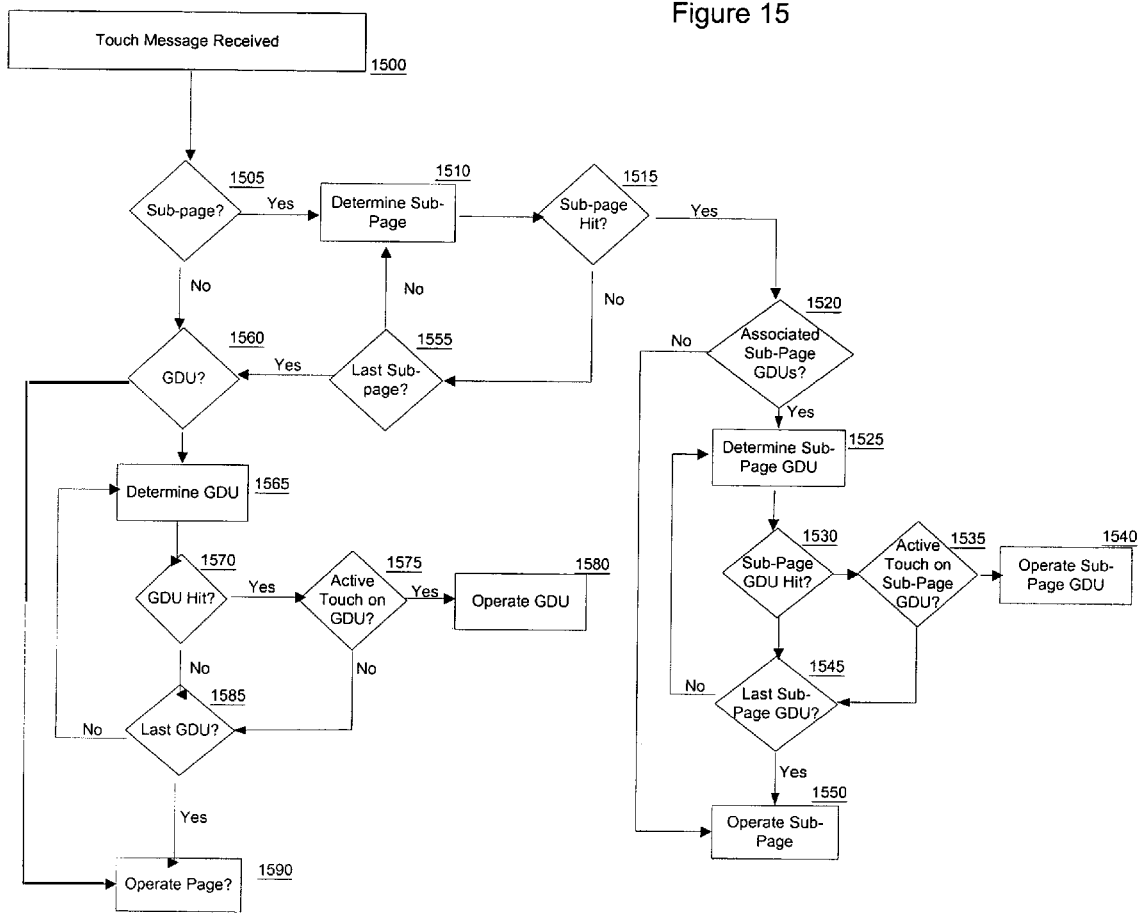
FIG. 15 is a flow diagram of the general steps of determining if a graphical display unit has been actively touched in accordance with the present invention.

FIGS. 15–21 illustrate the operation of the touch panel when a touch message is received, wherein FIG. 15 generally illustrates the process undertaken by the touch panel when such event occurs. A touch message is received when a user applies pressure to a region of a touch panel display upon the touch panel screen. Once a touch message is received to select a particular page of the touch panel display, the touch panel determines and orders the sub-pages associated with the page, as shown by block 1510. If sub-pages exist, the touch panel determines if any of the sub-pages have been hit, as in block 1515. A sub-page is "hit" if a touch message is received anywhere in the total touch area of its associated GDU. If a sub-page is hit, the touch panel determines if the sub-page has associated sub-page GDUs, as in block 1520. If no sub-page GDUs exist, then the touch panel operates the sub-page as in block 1550. If sub-page GDUs exist, the touch panel determines and orders the sub-page GDUs, as in block 1525. The order of the GDUs relates to the order of creation. Next, the touch panel determines if a sub-page GDU has been hit, as in blocks 1530 and 1535. If the sub-page GDU has been actively touched, then the touch panel operates the sub-page GDU, as in block 1540. If a sub-page GDU was the last sub-page GDU, as in block 1545, then the touch panel operates the sub-page, as in block 1550. If other sub-page GDUs exist, then the steps described above are repeated beginning at block 1525.

If the touch determines the sub-page was not hit, then the touch panel determines if that was the last sub-page, as in block 1555. If other sub-pages exist, then the touch panel begins over the process described above beginning with block 1510. If no other sub-pages exist, then it is determined if the page has GDUs as in block 1560. If GDUs exist, then all GDUs active on the page are ordered and determined if hit, as shown by blocks 1565and 1570. If it is determined that a GDU is hit, the touch panel then determines if the GDU was actively touched, as shown by block 1575. If the GDU was actively touched, then the GDU is operated, as shown by block 1580. If the GDU was not actively touched or the GDU was not hit, the touch panel then determines whether the GDU was the last GDU on the page, as shown by block 1585. If the GDU was not the last GDU on the page, then the next GDU in the order is determined, as shown by block 1565. If the GDU was the last GDU on the page, the touch panel then determines if the touch operates the page, as shown by block 1590. A page may have operational features separate and apart from the GDUs.

Figure 16:
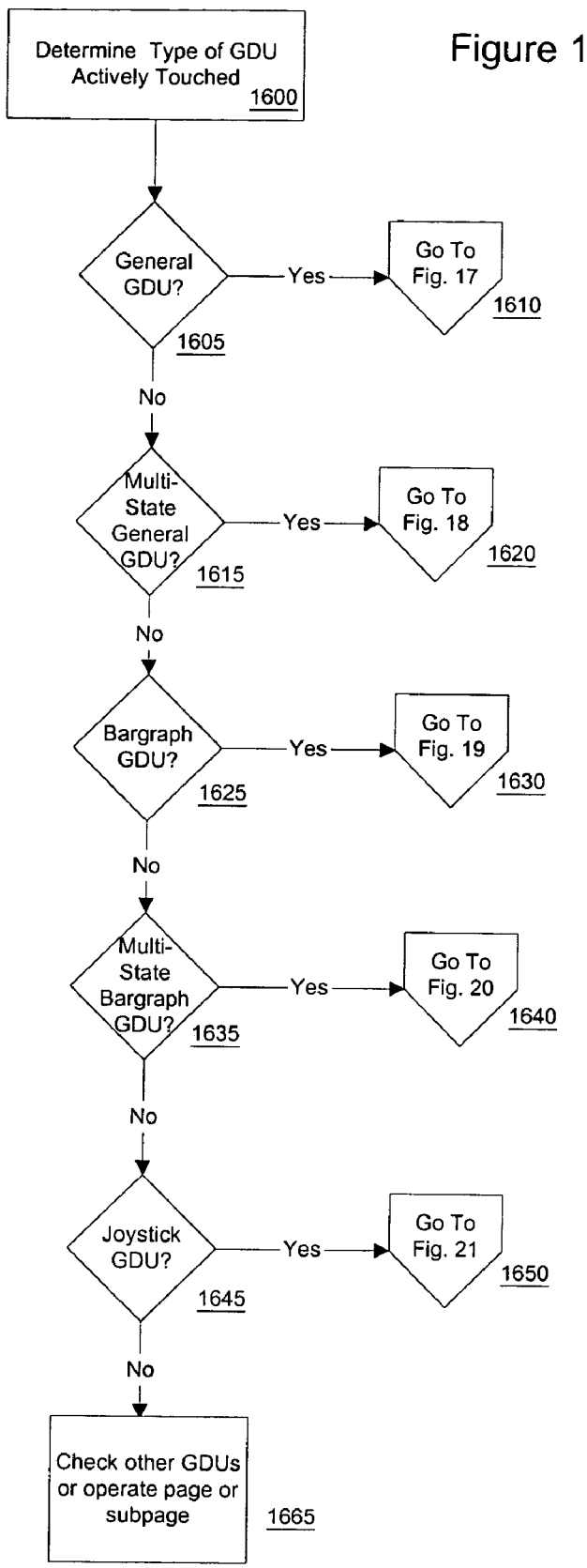
FIG. 16 is a flow diagram of the general steps of determining the type of graphical display unit actively touched in accordance with the present invention.

FIG. 16 illustrates generally the process undertaken once a GDU is actively touched. Block 1600 shows that the touch panel initially determines the type of GDU actively touched. To perform this function, the touch panel determines if the GDU was a general GDU, as shown by block 1605. If the GDU is a general GDU, then the general GDU is operated, as shown by block 1610. If the touch panel determines that the GDU is not a general GDU, then the touch panel determines whether the GDU actively touched was a multi-state general GDU, as shown by block 1615. If the touch panel determines that the GDU was a multi-state general GDU, then the multi-state general GDU is operated, as shown by block 1620. If the touch panel determines that the GDU is not a multi-state general GDU, then the touch panel determines whether the GDU actively touched was a bargraph general GDU, as shown by block 1625. If the touch panel determines that the GDU was a bargraph GDU then the bargraph GDU is operated, as shown by block 1630. If the touch panel determines that it is not a bargraph GDU, then the touch panel determines whether the GDU actively touched was a multi-state bar graph GDU, as shown by block 1635. If the touch panel determines that the GDU was a multi-state bargraph GDU, then the multi-state bargraph GDU is operated, as shown by block 1640. If the touch panel determines that the GDU is not a multi-state bargraph GDU, then the touch panel determines whether the GDU actively touched was a joystick GDU, as shown by block 1645. If the touch panel determines that the GDU was a joystick GDU, then the joystick GDU is operated, as shown by block 1650. If the touch panel determines that the GDU is not a joystick GDU, then the touch panel checks other GDUs, or operates the page or subpage, as shown by block 1665.

Figure 17:
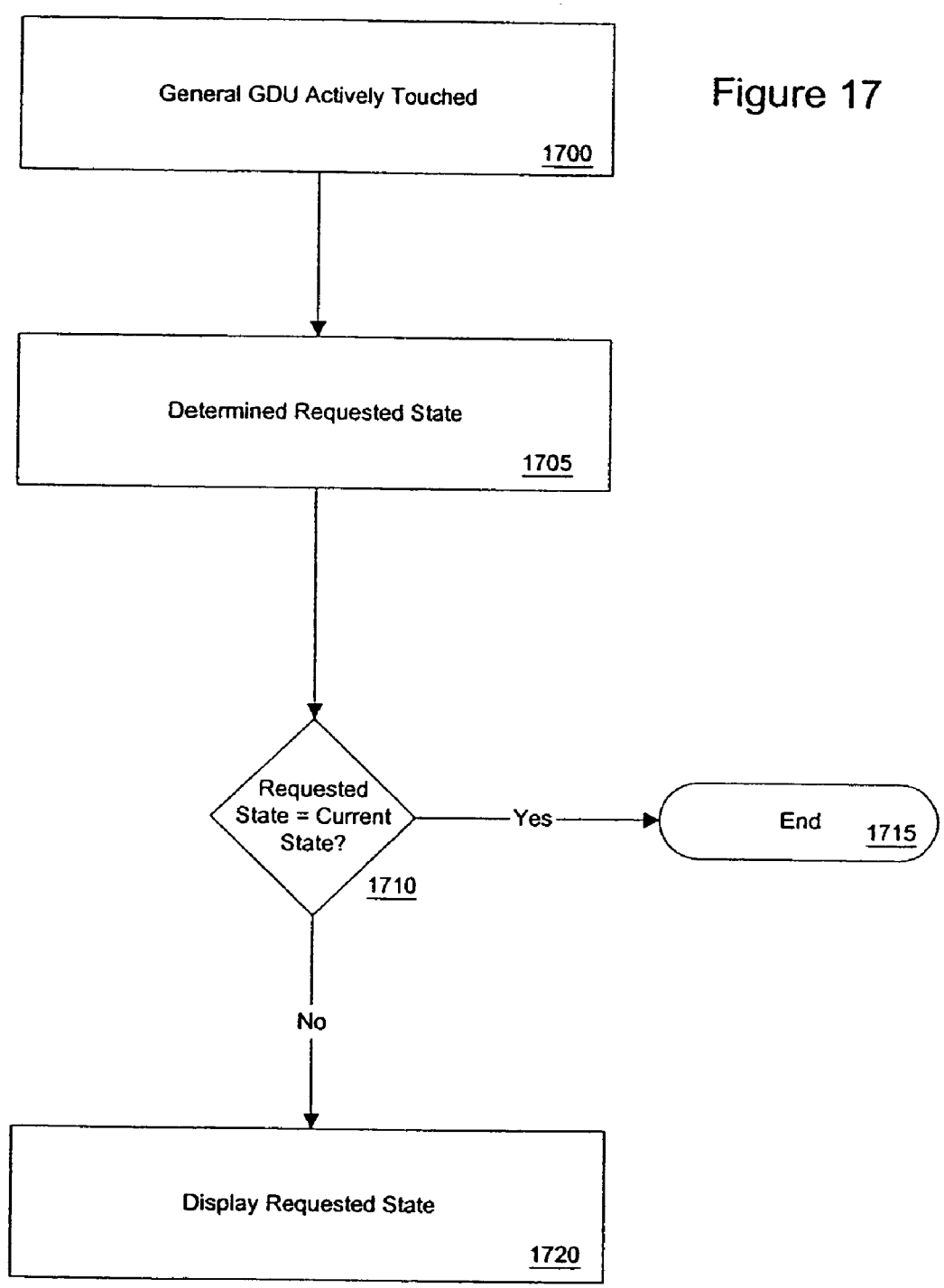
FIG. 17 is a flow diagram of the general operation of a general graphical display unit of the present invention.

FIG. 17 shows the operation of an actively touched general GDU, as shown by block 1700. Once it is determined that a general GDU has been actively touched, the requested state of the general GDU is determined, as shown by block 1705. After the requested state is determined, the requested state is compared with the current state of the general GDU to see if the states are the same, as shown by block 1710. If the requested state equals the current state, then the process ends, as shown by block 1715. If the requested state does not equal the current state, then the requested state is displayed, as shown by block 1720. It should be appreciated that if the requested state has not yet been built, then the process described in the preceding figures for building the state of a GDU would be followed.

Figure 18:
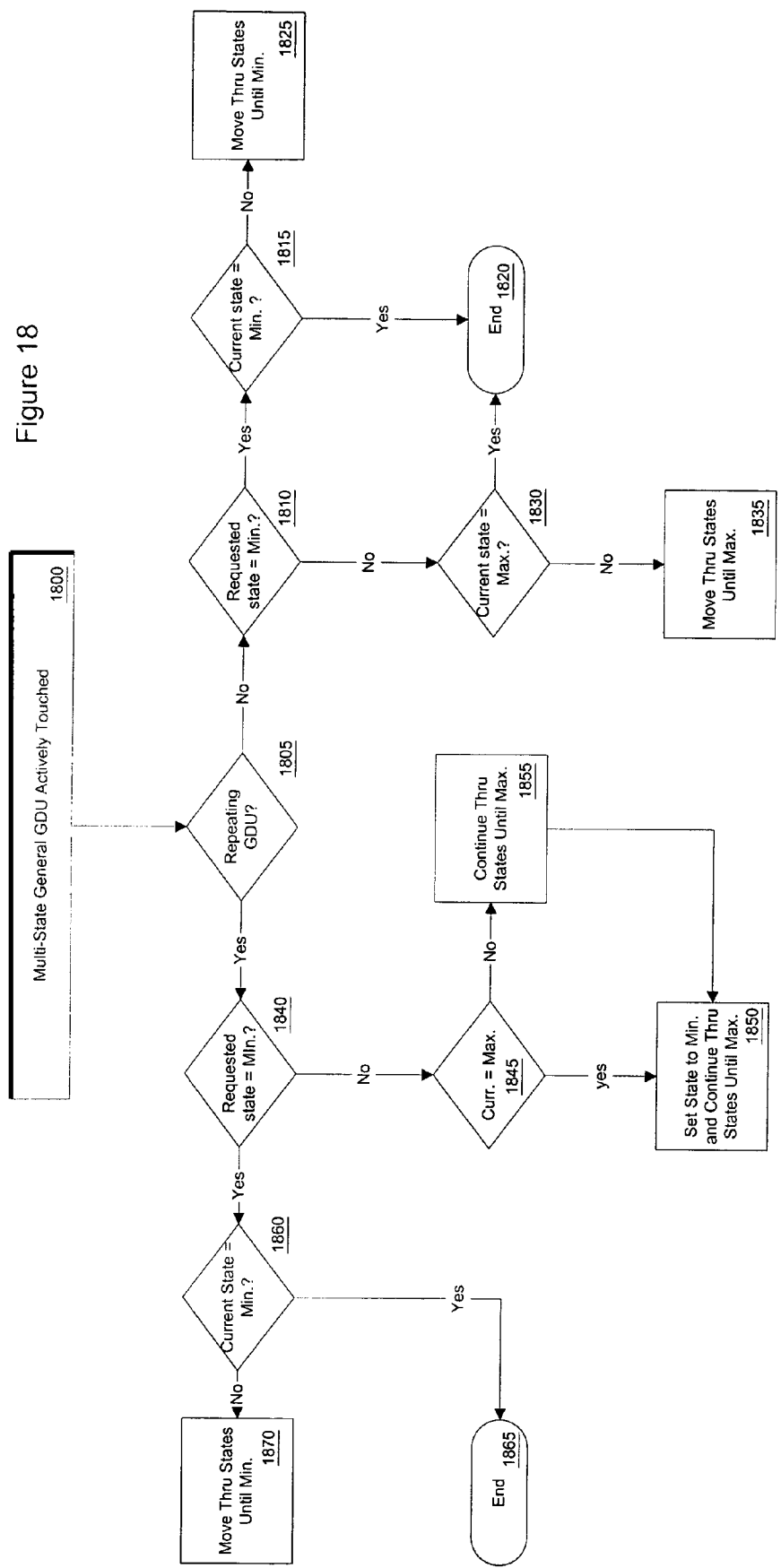
FIG. 18 is a flow diagram of the general operation of a multi-state general graphical display unit of the present invention.

FIG. 18 shows the operation of an actively touched multi-state general GDU. as shown by block 1800. Once a multi-state general GDU has been actively touched, a determination is made as to whether the multi-state general GDU is a repeating GDU, as shown by block 1805. If the multi-state general GDU is not a repeating GDU, then it is determined whether the requested state equals min, as shown by block 1810. If the requested state equals min, then it is determined whether the current state equals min, as shown in block 1815. If the current state equals min, then the operation ends, as shown by block 1820. If the current level does not equal min, then the multi-state general would change display from its current state to min, sequentially displaying each state between its current state and its min state, as shown by block 1825. It should be appreciated that if any state between the current state and min does not exist, then that state would be built in accordance with the processes and figures described above.

If the requested state does not equal min, then it is determined whether the current state equals max, as shown by block 1830. If the current state equals max, then the operation ends, as shown by block 1820. If the current state does not equal max, then the multi-state general would change display from its current state to max, sequentially displaying each state between its current state and its max state, as shown by block 1835. It should be appreciated that if any state between the current state and max does not exist, then that state would be built in accordance with the processes and figures described above.

If it is determined that the multi-state general GDU is a repeating GDU, then it is determined whether the requested state equals min, as shown by block 1840. If the requested state does not equal min, it is determined whether the current state equals max, as shown by block 1845. If the current state equals max, then the state of the multi-state general GDU is set to min and the multi-state general GDU continues to change display from its min state to its max state, sequentially displaying all states in-between, as shown by block 1850. It should be appreciated that this operation allows for the multi-state general GDU to be continuously animated. For example, the multi-state general GDU may be built to resemble a stopwatch such that the min state equals 0 and the max state equals 60. Each state in-between the min state and the max state would account for a one second time interval. Thus, the second hand on the stopwatch would be continuously moving from 0 to 60 under the process described above.

If the current state does not equal max, then the multi-state general would change display from its current state to max, sequentially displaying each state between its current state and its max state, as shown by block 1855. Once the max state has been achieved, then the state is set to min and the multi-state general GDU continues to change display from its min state to its max state, sequentially displaying all states in-between, as shown by block 1850. It should be appreciated that if any state necessary for the operations described in reference to blocks 1850 or 1855 does not exist in the GDU cache, then that state would be built in accordance with the processes and figures described above.

If the requested state equals min, then it is determined whether the current state equals min, as shown by block 1860. If the current state equals min, then the operation of the multi-state general GDU ends, as shown by block 1865. If the current state does not equal min, then the multi-state general GDU would change display from its current state to min, sequentially displaying each state between its current state and its min state, as shown by block 1870. Again, it should be appreciated that if any state between the current state and min does not exist, then that state would be built in accordance with the processes and figures described above.

Figure 19:
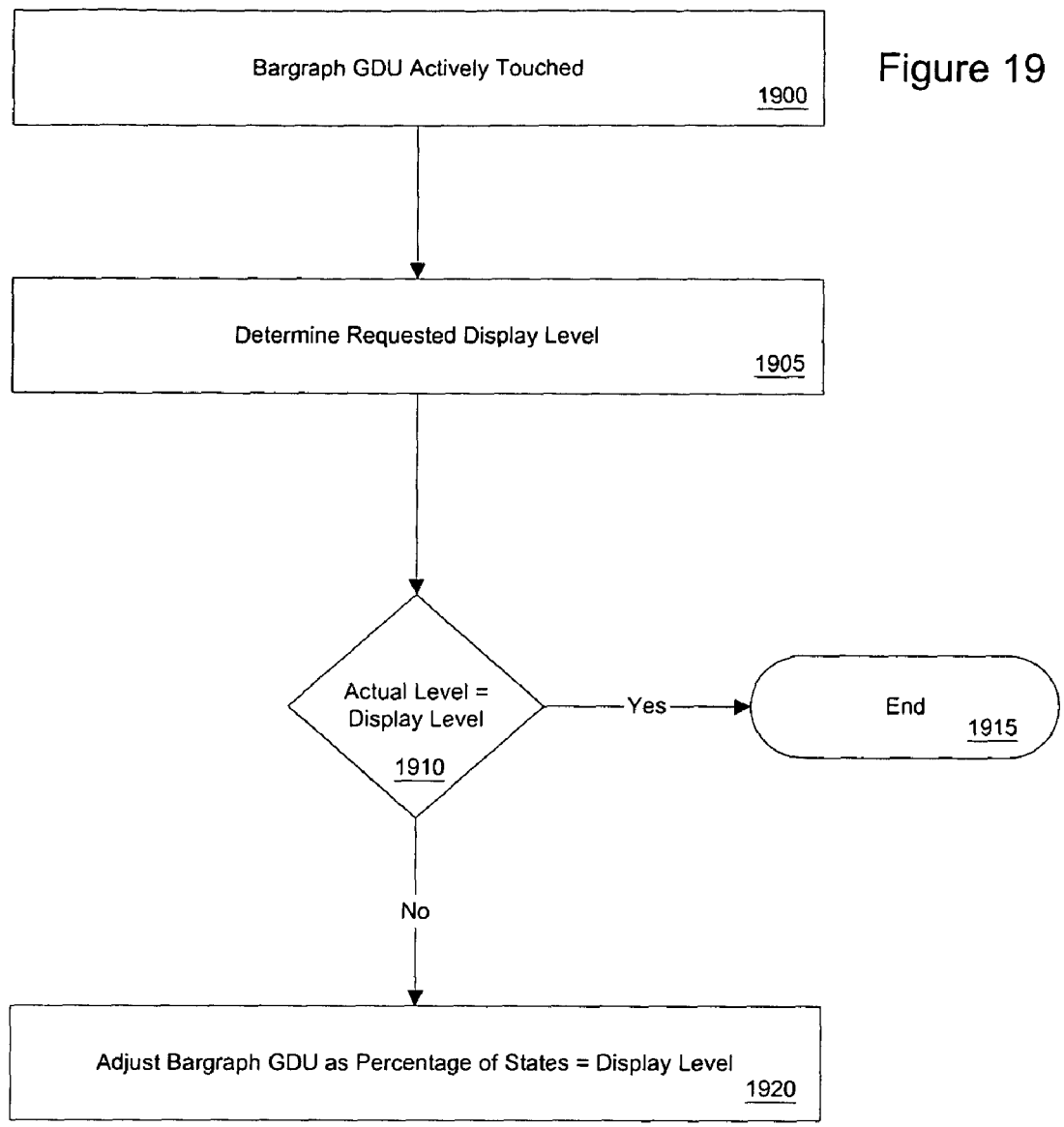
FIG. 19 is a flow diagram of the general operation of a bargraph graphical display unit of the present invention.

FIG. 19 illustrates the operation of an actively touched bargraph GDU, as shown by block 1900. Once it is determined that a bargraph GDU has been actively touched, block 1905 shows that the requested display level for the bargraph GDU is determined. A determination is then made as to whether the actual level of the bargraph GDU is equal to the requested display level, as shown by block 1910. If the actual level equals the display level, then the operation of the bargraph GDU ends, as shown by block 1915. If the actual level does not equal the display level, then the bargraph GDU is adjusted to show a percentage of its states equal to the requested display level, as shown by block 1920. For example, if the bargraph GDU represents a volume control bar and the two states of the bargraph GDU are blue and yellow, then when the requested display level equals 70%, the yellow state of the bar graph GDU would fill 70% of the available area of the bargraph GDU and the blue state would fill 30% of the available area of the bargraph GDU.

Figure 20:
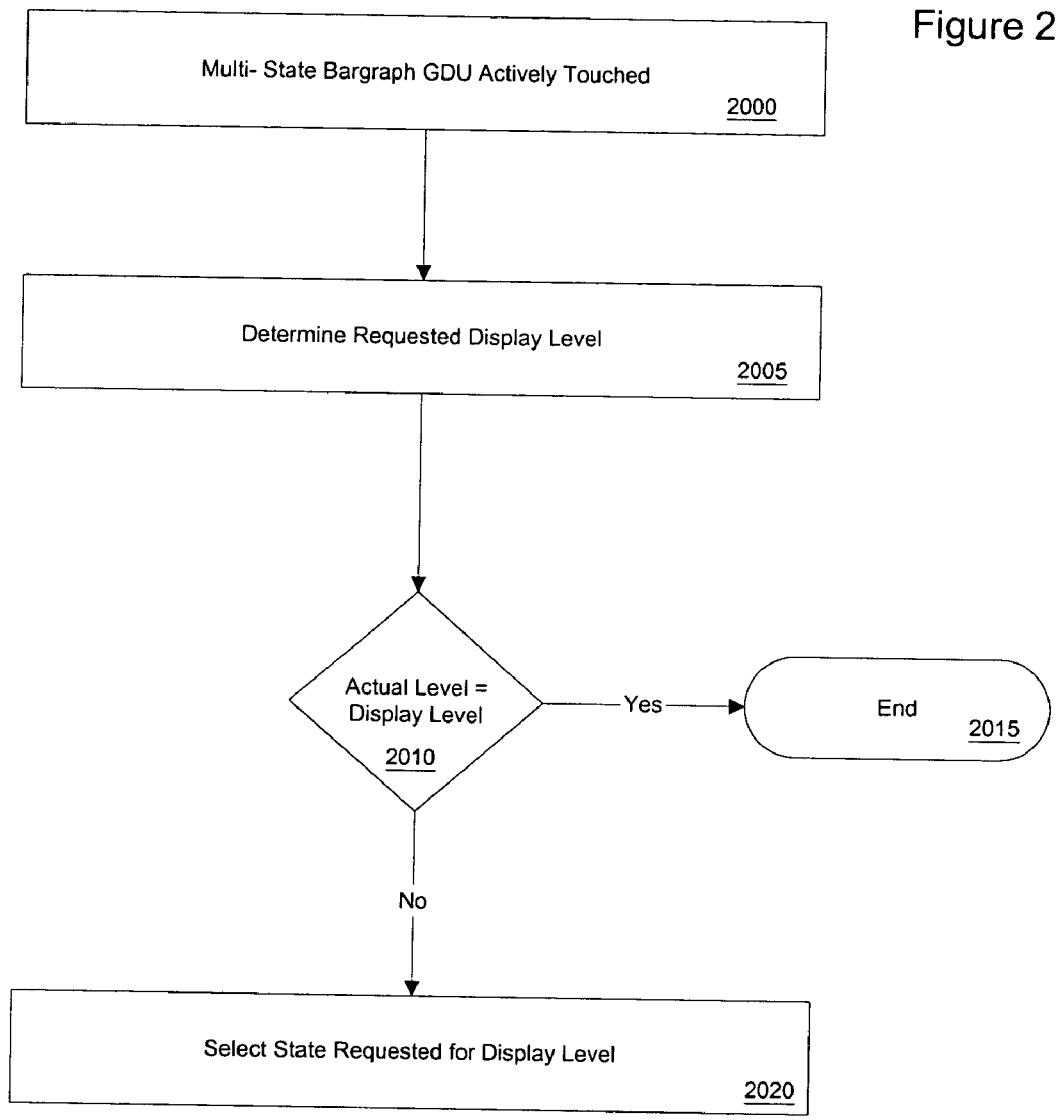
FIG. 20 is a flow diagram of the general operation of a multi-state bargraph graphical display unit of the present invention.

FIG. 20 shows the operation of an actively touched multi-state bargraph GDU, as shown by block 2000. After determining that a multi-state bargraph GDU has been actively touched, the requested display level is determined, as shown by block 2005. Block 2010 shows that the actual level of the multi-state bargraph GDU is then compared with the requested display level. If the actual level equals the display level, then the operation of the multi-state bar graph GDU ends, as shown by block 2015. If the actual level does not equal the requested display level, then the state of the multi-state bargraph GDU representing the requested display level is displayed, as shown by block 2020. It should be appreciated that if the state representing the requested display level does not exist, then that state will be built in accordance with the processes and figures described above.

Figure 21:
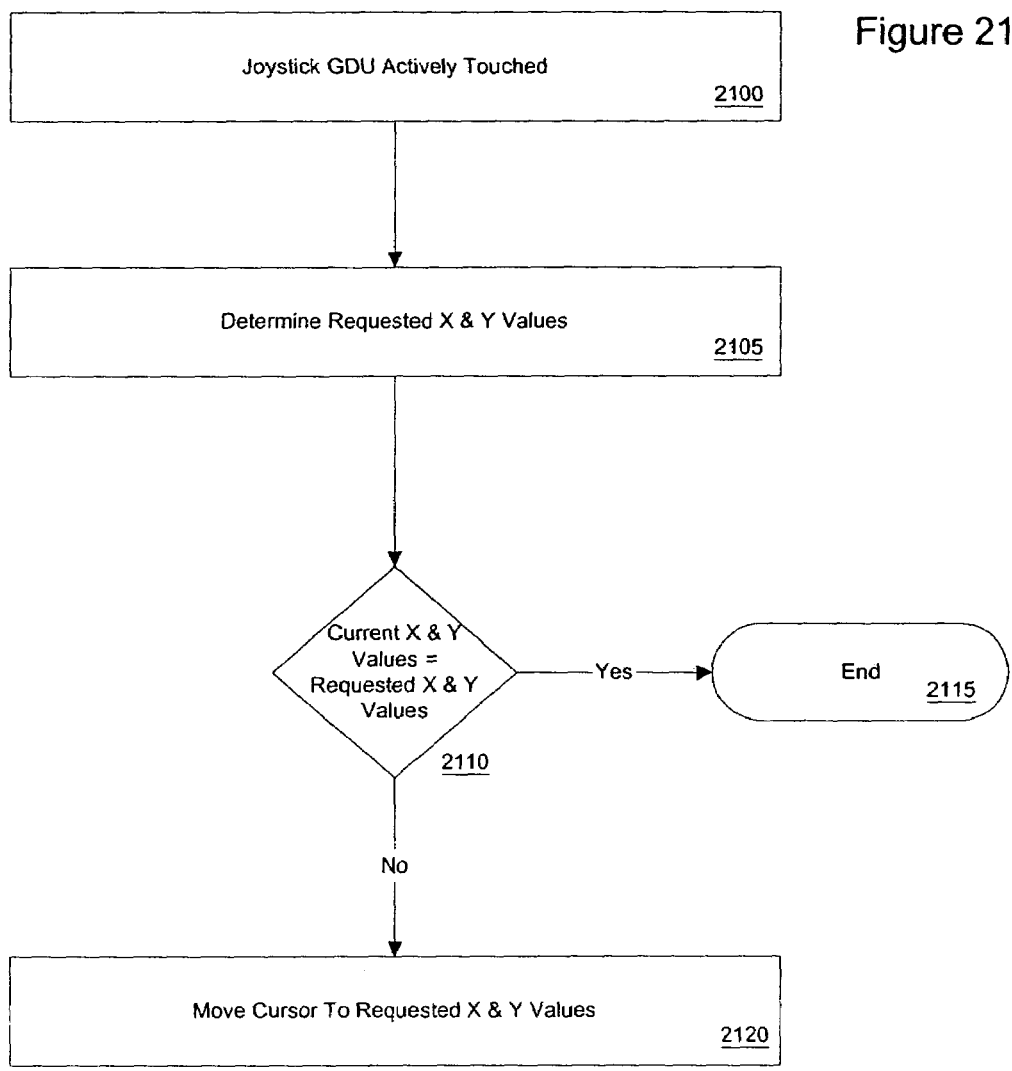
FIG. 21 is a flow diagram of the general operation of a joystick graphical display unit of the present invention.

FIG. 21 shows the operation of an actively touched joystick GDU, as shown by block 2100. Initially, the requested cursor X and Y values are determined, as shown by block 2105. Block 2110 shows that the current cursor X and Y values are then compared with the requested X and Y values to determine if they are equal. If the current cursor X and Y values equal the requested cursor X and Y values, then the operation of the joystick GDU ends, as shown by block 2115. If the current cursor X and Y values are not equal to the requested cursor X and Y values, then the cursor associated with the joystick GDU is moved to the requested cursor X and Y values, as shown by block 2120. It should be appreciated that to move the cursor to the requested cursor X and Y values, a different state of the joystick GDU is displayed. It should further be appreciated that if the state of the joystick GDU with the requested cursor X and Y values does not exist, then that state will be built in accordance with the processes and figures described above.

Obviously, many other modifications and variations of the present invention are possible in light of the above teachings. The specific embodiments discussed here are merely illustrative and are not meant to limit the scope of the present invention in any manner. It should be appreciated that the present invention provides many applicable inventive concepts that may be embodied in a wide variety of specific contexts. It is therefore to be understood that within the scope of the disclosed concept, the invention may be practiced otherwise than as specifically described.

What is claimed is:

1. A method for animating a graphical display unit comprising the steps of:
    setting a max state and a min state for the graphical display unit, the graphical display unit having two or more states;
    determining each state that exists between the max state and the min state;
    receiving a command to activate the graphical display unit;
    upon receipt of the command to activate the graphical display unit in connection with a specified state, setting the state of the graphical display unit to the min state;
    sequentially displaying each state between the min state and the max state until the max state is the state of the graphical display unit; and
    upon achieving the max state of the graphical display unit, resetting the state of the graphical display unit to the min state, and then sequentially displaying each state between the min state and the max state until the specified state is the state of the graphical display unit.

2. The method of claim 1, wherein;
    said step of sequentially displaying each state further comprises the step of retrieving each state between the min state and the max state from a graphical display unit cache.

3. The method of claim 2, wherein:
    said step of sequentially displaying each state further comprises the step of building each state between the min state and the max state that has not been previously built and stored in the graphical display unit cache.

\* \* \* \* \*